(12) United States Patent
Shae et al.

(10) Patent No.: US 8,833,359 B2
(45) Date of Patent: Sep. 16, 2014

(54) APPARATUS, SYSTEM AND METHOD FOR USING A DIAMOND-IMPREGNATED WIRE TO CUT AN OBJECT

(71) Applicant: Mactech, Inc., Red Wing, MN (US)

(72) Inventors: Steve Shae, Owatonna, MN (US); Joel Kent Wittenbraker, Red Wing, MN (US)

(73) Assignee: Mactech, Inc., Red Wing, MN (US)

( * ) Notice: Subject to any disclaimer, the term of this patent is extended or adjusted under 35 U.S.C. 154(b) by 0 days.

(21) Appl. No.: 14/138,828

(22) Filed: Dec. 23, 2013

(65) Prior Publication Data

US 2014/0109740 A1 Apr. 24, 2014

Related U.S. Application Data

(62) Division of application No. 12/660,766, filed on Mar. 4, 2010, now Pat. No. 8,651,098.

(51) Int. Cl.
*B28D 1/08* (2006.01)

(52) U.S. Cl.
USPC ............ 125/21; 125/16.02; 83/811; 83/651.1

(58) Field of Classification Search
USPC ............ 125/12, 14, 16.01, 16.02, 21; 83/794, 83/795, 796, 651.1, 809, 810, 811
See application file for complete search history.

(56) References Cited

U.S. PATENT DOCUMENTS

| | | | | | |
|---|---|---|---|---|---|
| 482,103 | A | * | 9/1892 | Speer | 83/796 |
| 1,420,950 | A | * | 6/1922 | Elder | 83/794 |
| 4,038,962 | A | * | 8/1977 | Tessner | 125/21 |
| 4,854,296 | A | * | 8/1989 | Pittet | 125/21 |
| 4,915,000 | A | * | 4/1990 | MacFarlane | 83/651.1 |
| 5,597,041 | A | * | 1/1997 | Robinson | 166/55 |
| 5,645,040 | A | * | 7/1997 | Bieri jun. | 125/21 |
| 6,065,462 | A | * | 5/2000 | Hodsden et al. | 125/21 |
| 6,267,037 | B1 | * | 7/2001 | McCoy et al. | 83/745 |
| 6,279,564 | B1 | * | 8/2001 | Hodsden et al. | 125/21 |
| 6,881,131 | B2 | * | 4/2005 | Parsells et al. | 451/53 |
| 7,406,905 | B2 | * | 8/2008 | Lawler et al. | 83/651.1 |
| 8,056,633 | B2 | * | 11/2011 | Barra et al. | 166/298 |
| 8,286,625 | B2 | * | 10/2012 | Jenkins | 125/21 |
| 2007/0267006 | A1 | * | 11/2007 | Ogyu | 125/21 |
| 2008/0022830 | A1 | * | 1/2008 | Lawler et al. | 83/651.1 |
| 2009/0266552 | A1 | * | 10/2009 | Barra et al. | 166/339 |
| 2009/0293856 | A1 | * | 12/2009 | Jenkins | 125/14 |
| 2012/0174723 | A1 | * | 7/2012 | Matteucci | 83/794 |
| 2013/0000451 | A1 | * | 1/2013 | Jenkins | 83/13 |

* cited by examiner

*Primary Examiner* — Eileen P. Morgan
(74) *Attorney, Agent, or Firm* — Patents + TMS, P.C.

(57) ABSTRACT

An apparatus, a system and a method may use a diamond-impregnated wire loop to cut an underwater pipeline. The apparatus may have a frame, a carriage attached to the frame and/or pulleys connected to the carriage. The diamond-impregnated wire loop may be connected to the pulleys. The carriage may move relative to the frame to direct the diamond-impregnated wire loop in a forward direction relative to the frame and/or through the pipeline.

5 Claims, 15 Drawing Sheets

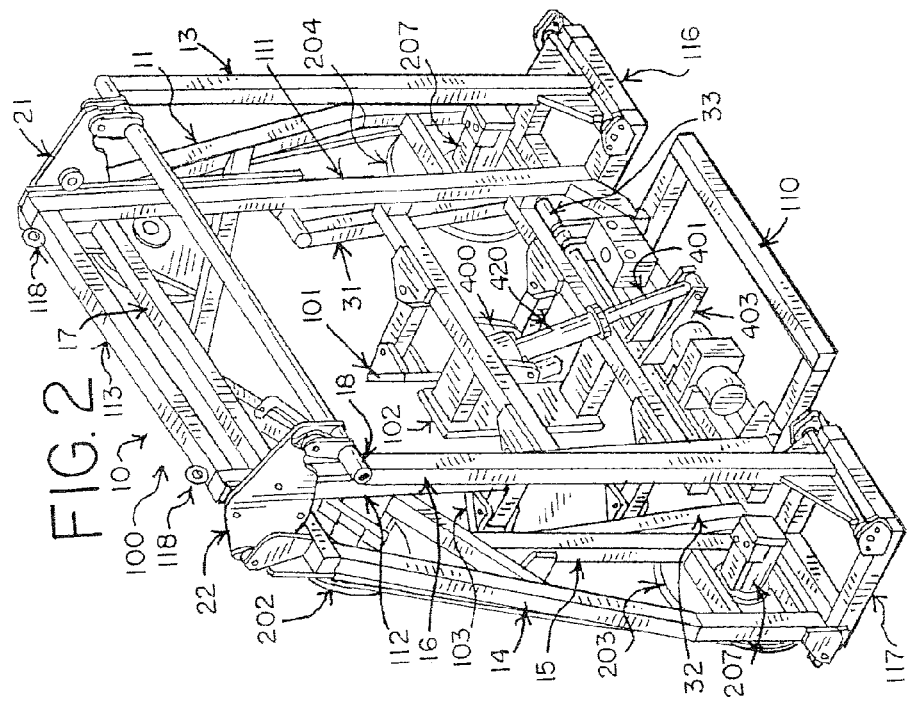
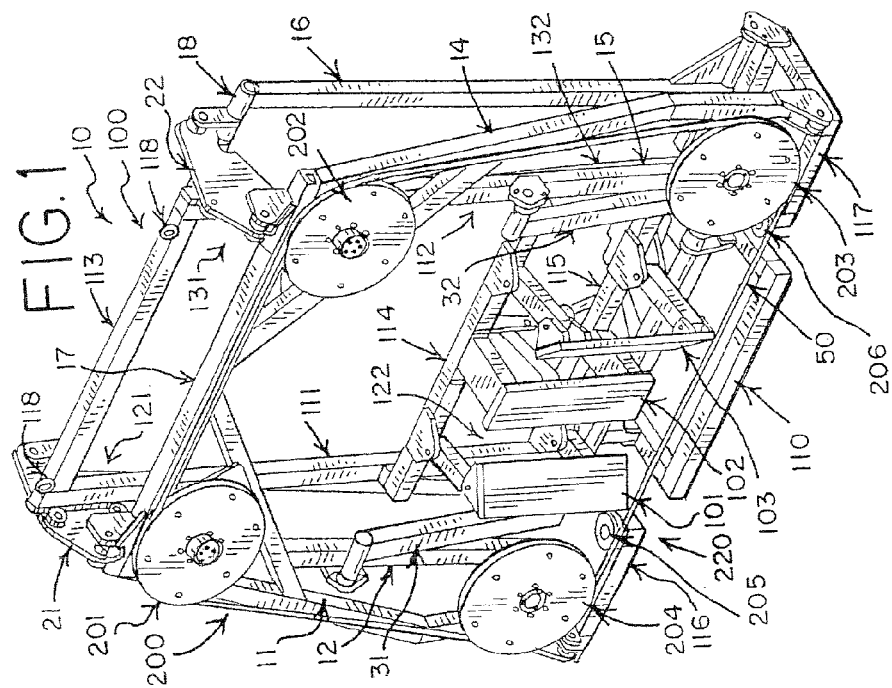

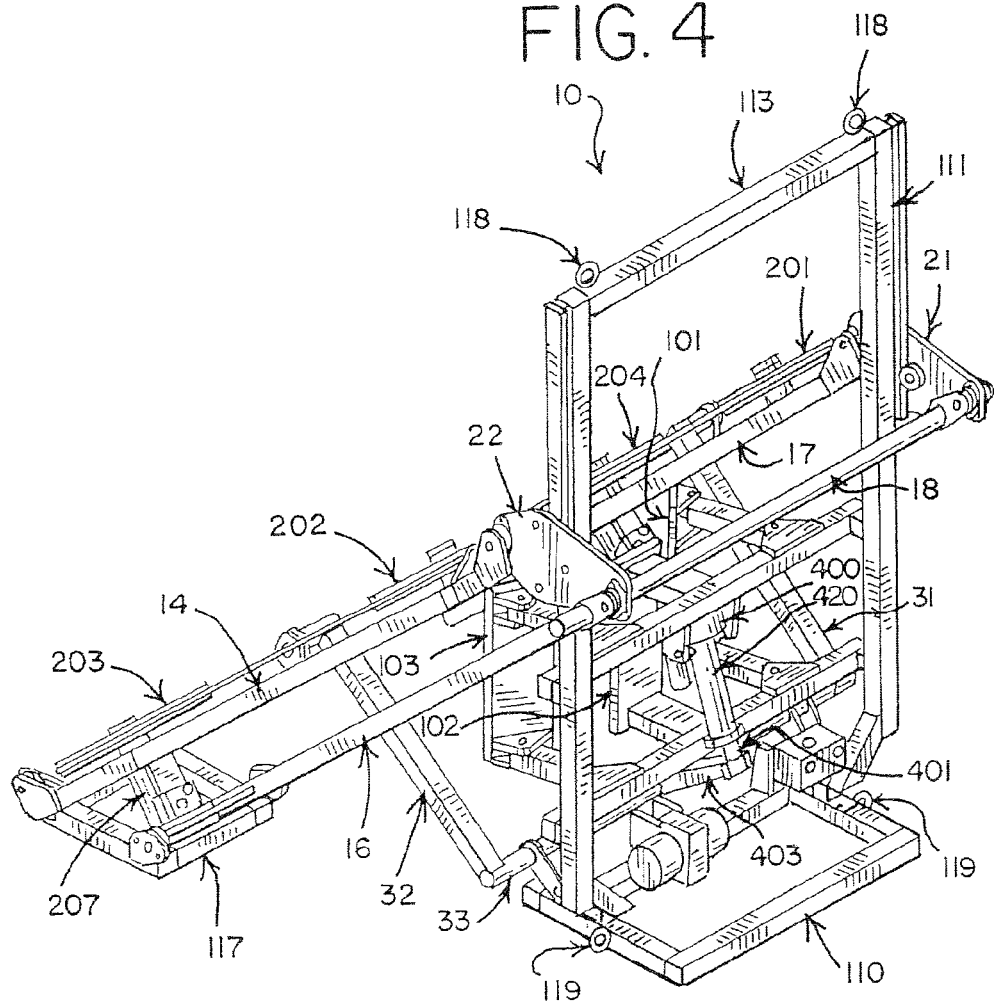

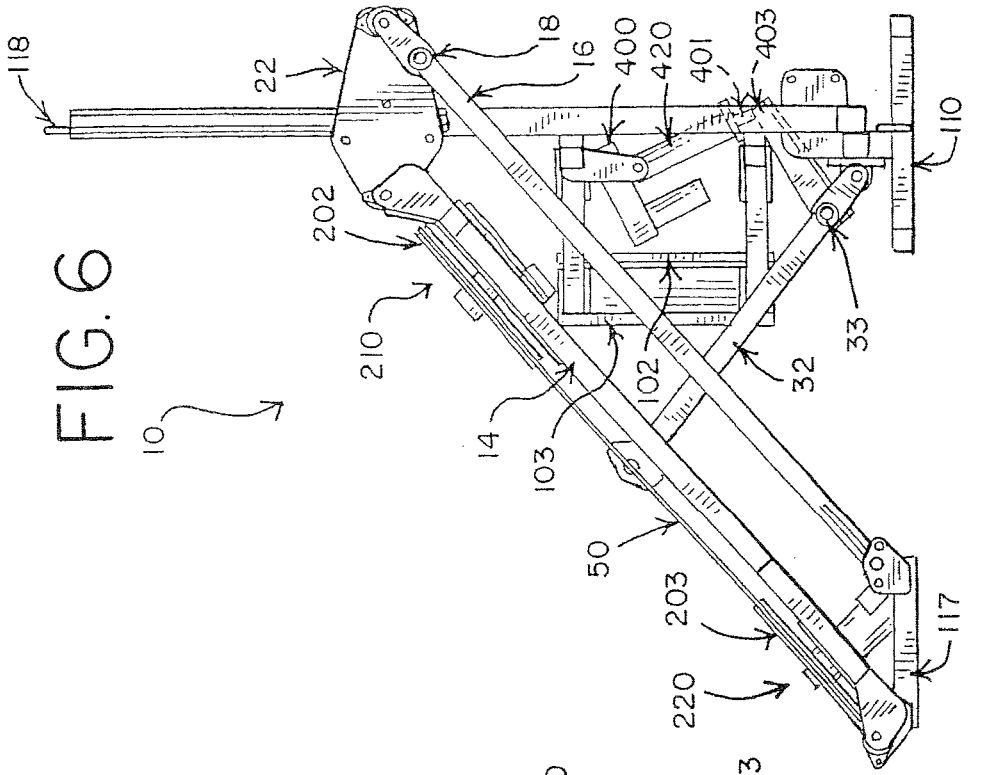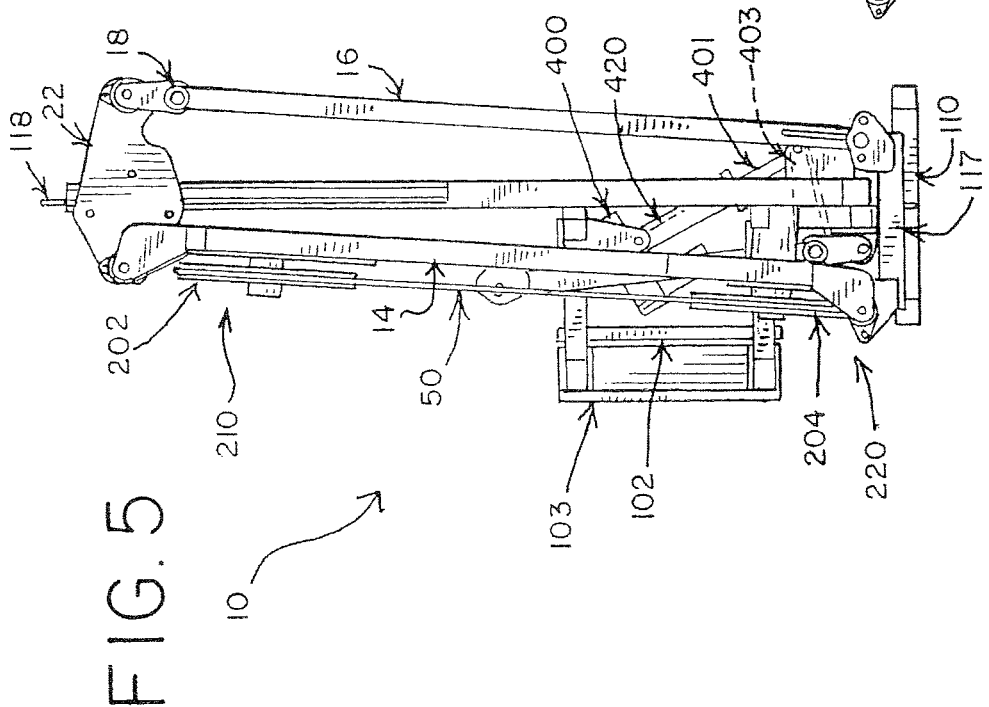

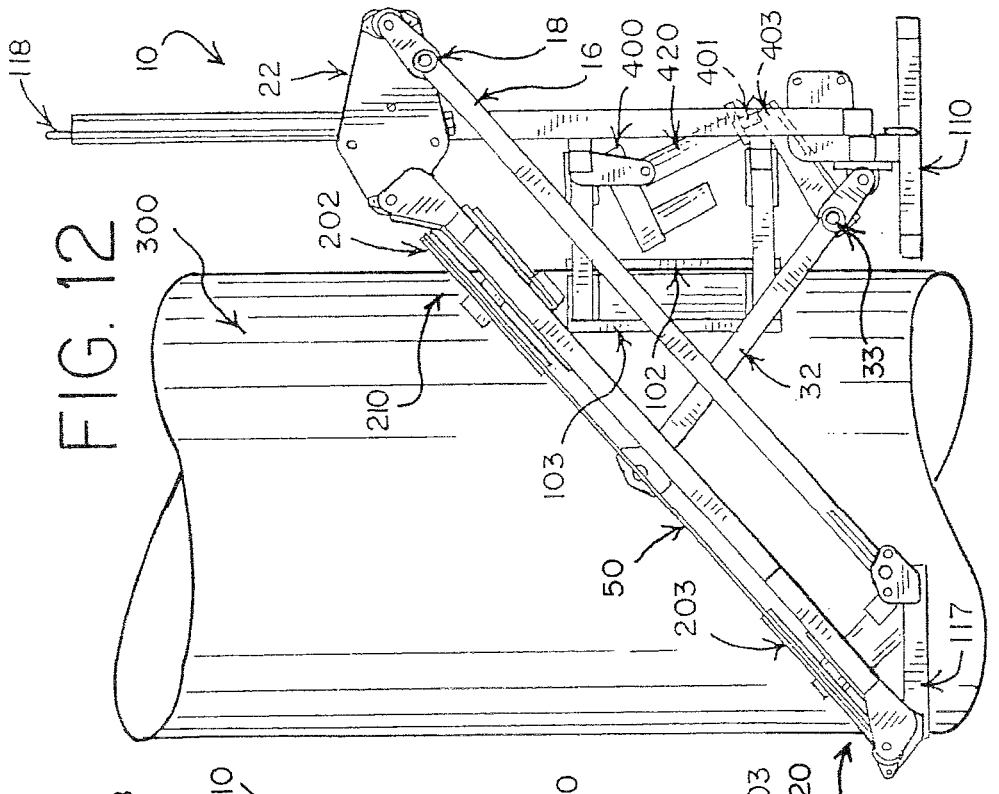
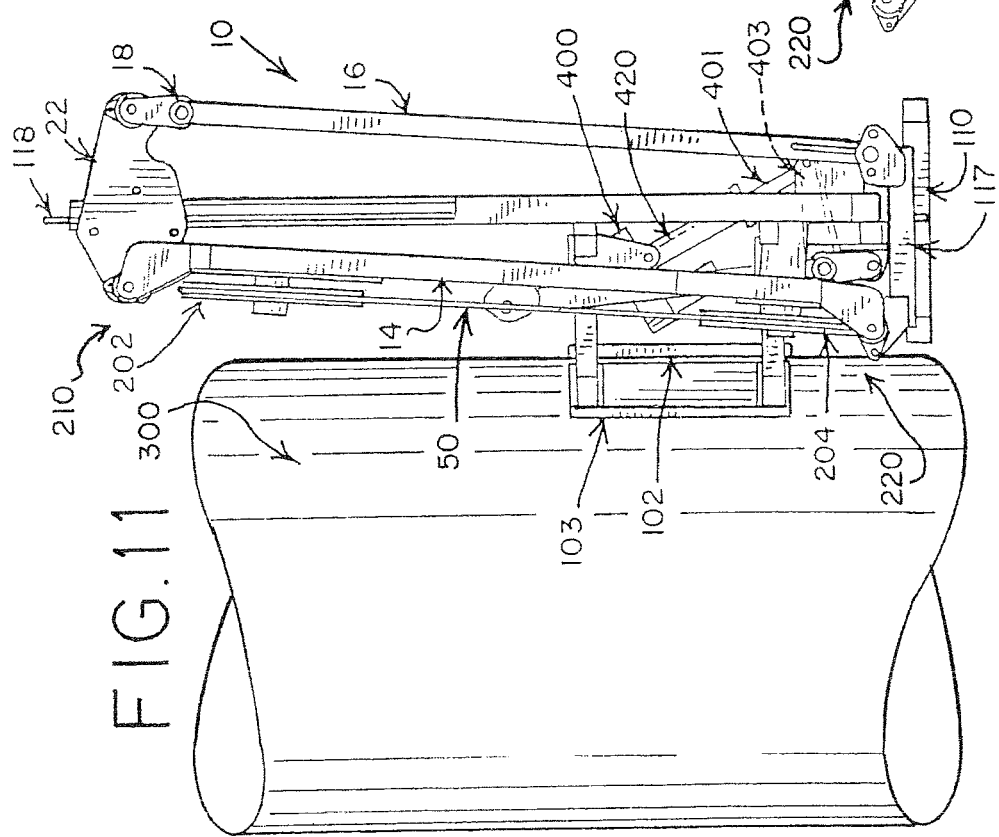

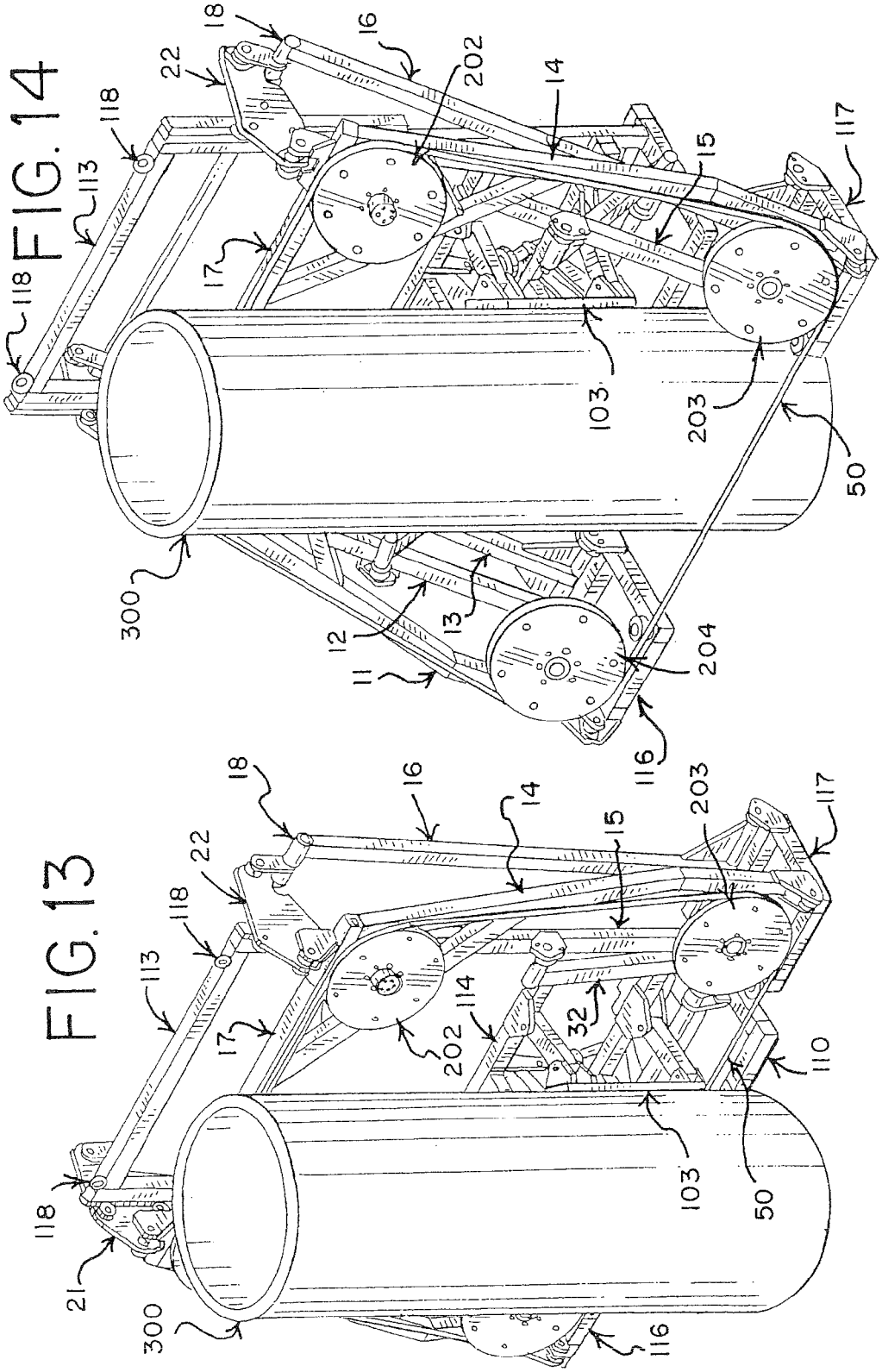

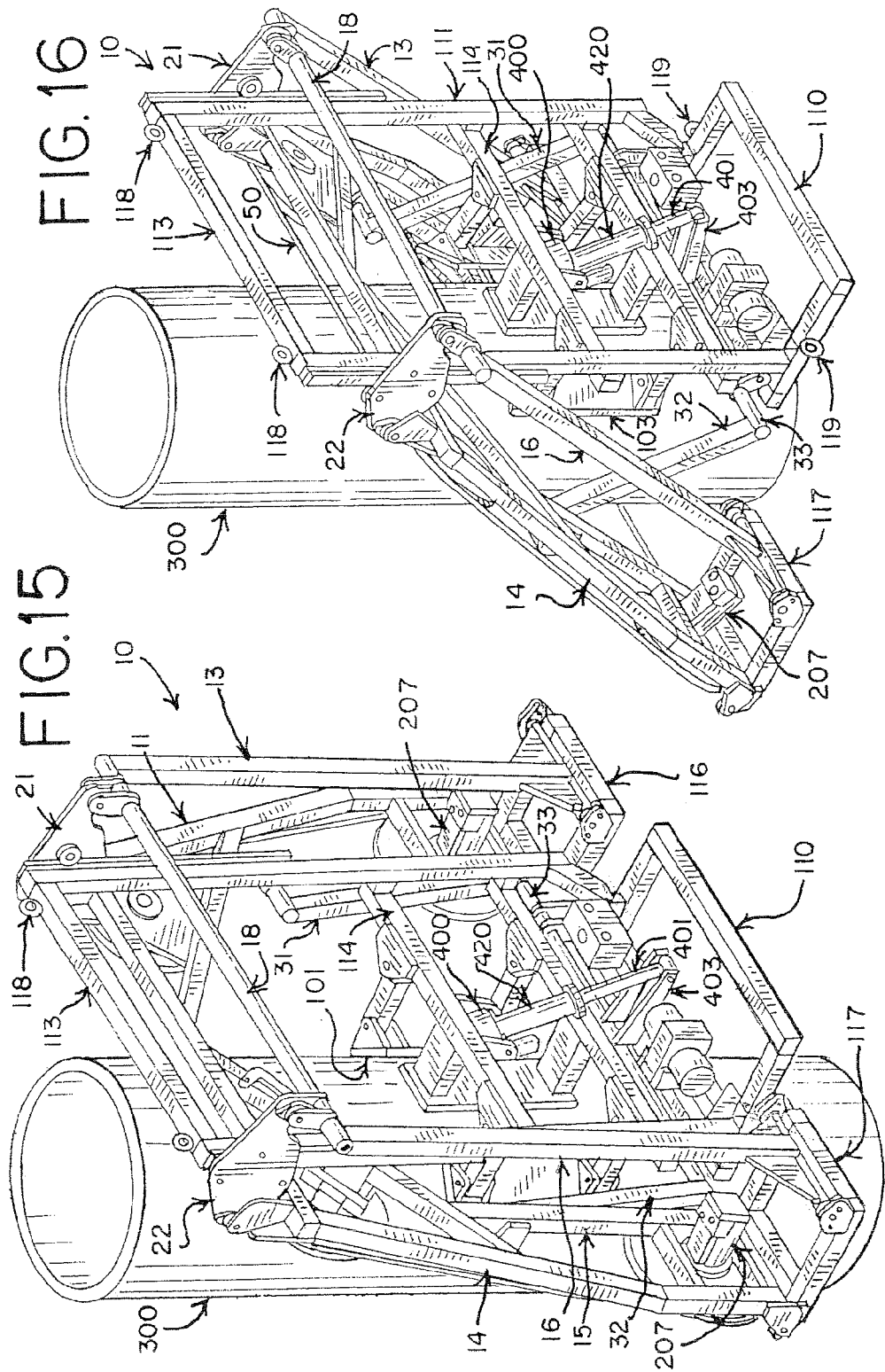

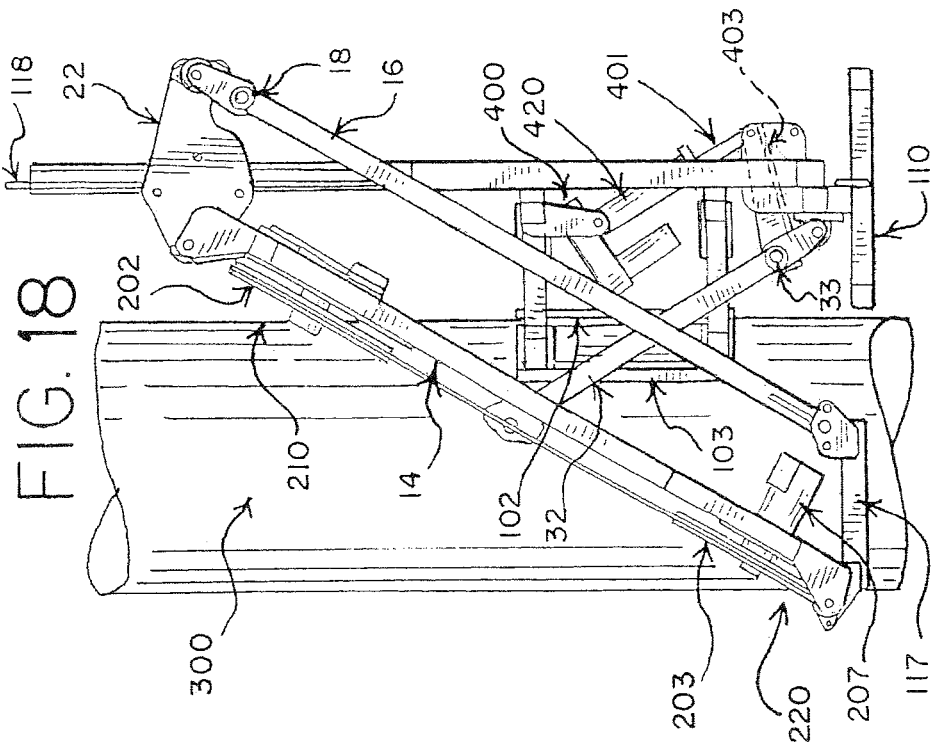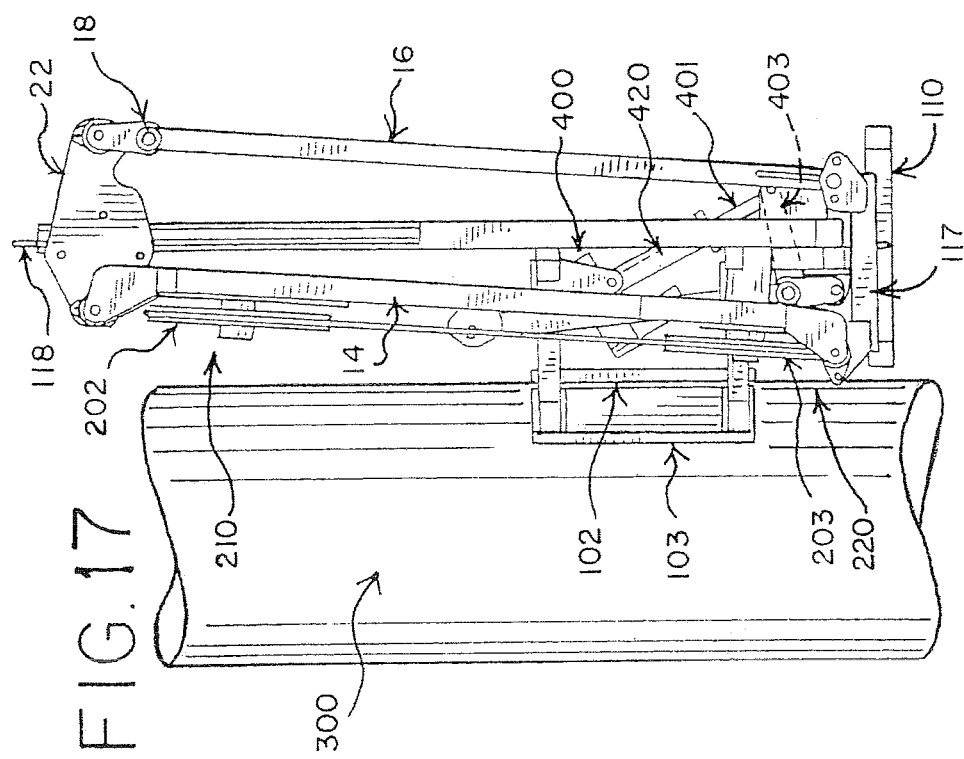

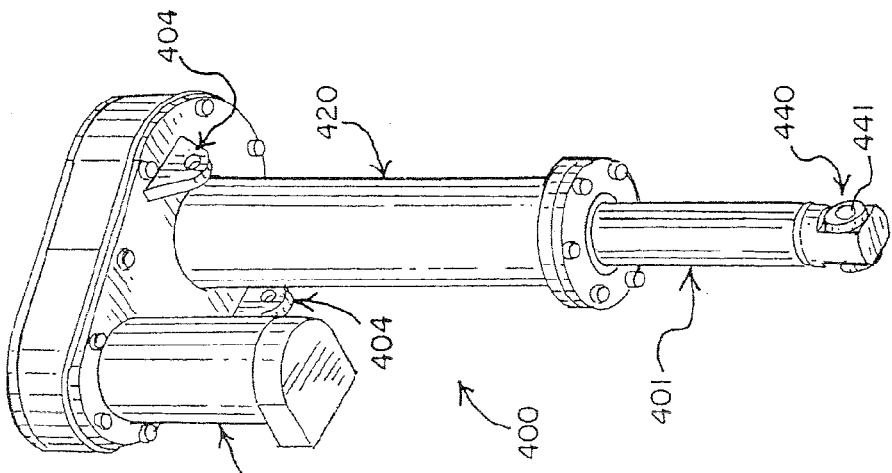
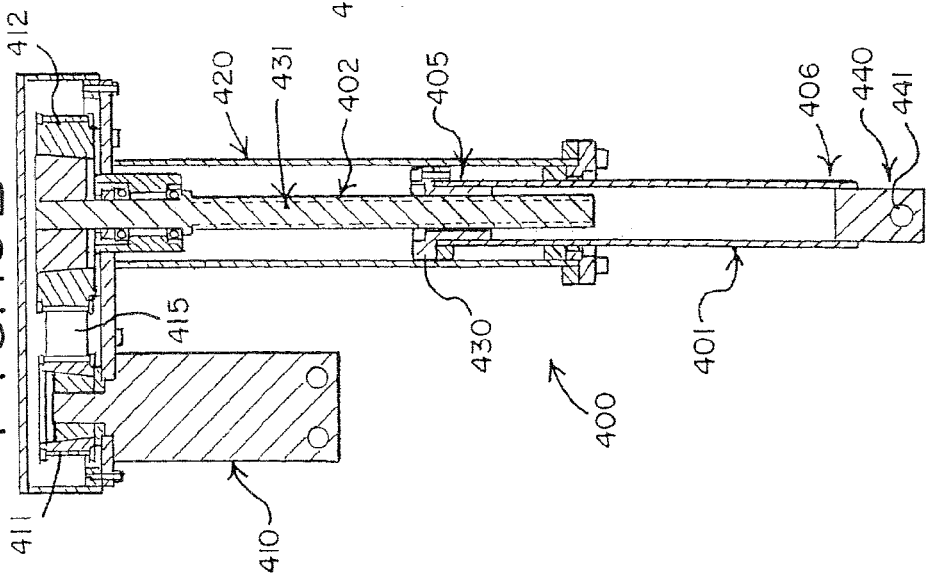
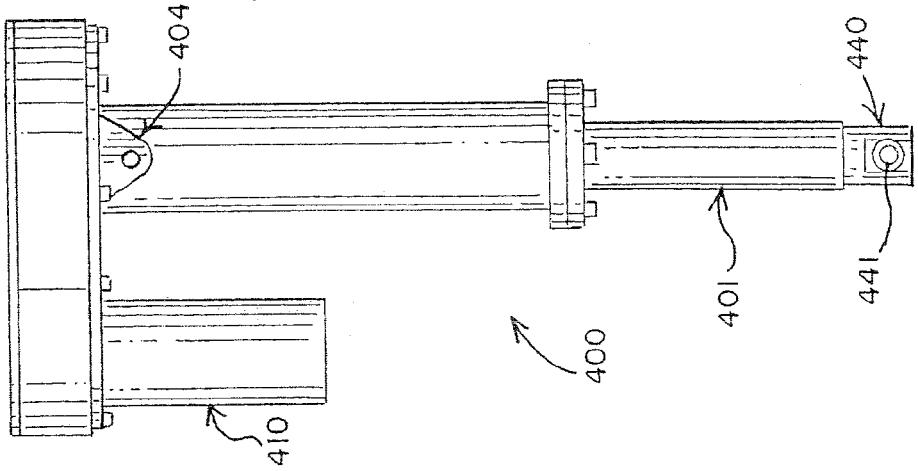

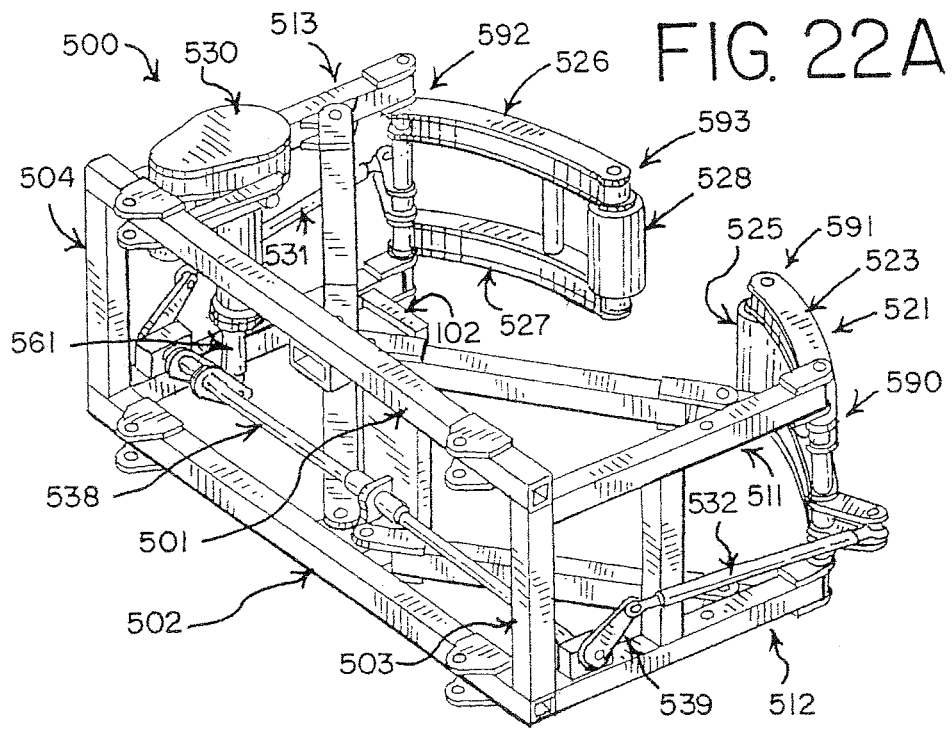
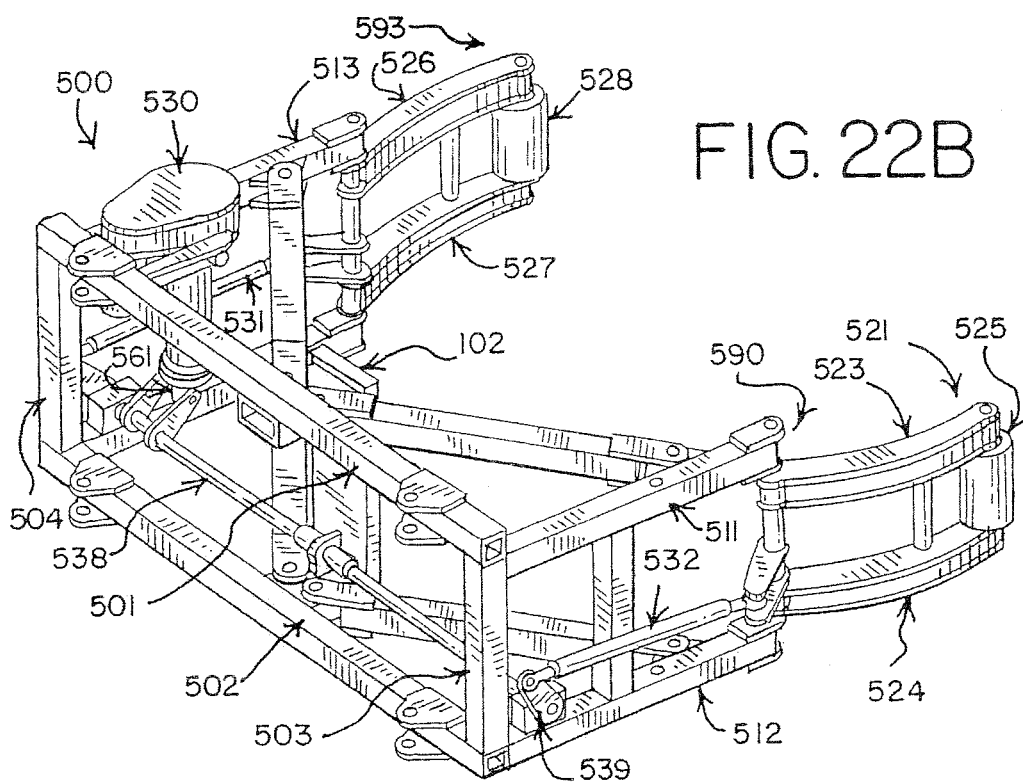

APPARATUS, SYSTEM AND METHOD FOR USING A DIAMOND-IMPREGNATED WIRE TO CUT AN OBJECT

CROSS-REFERENCE TO RELATED APPLICATIONS

This application is a divisional application of and claims the benefit of U.S. application Ser. No. 12/660,766 filed Mar. 4, 2010.

BACKGROUND OF THE INVENTION

The present invention generally relates to an apparatus, a system and a method for using a diamond-impregnated wire to cut an object. More specifically, the present invention relates to an apparatus that may use a diamond-impregnated wire loop to cut an underwater pipeline. The apparatus may have a frame, a carriage attached to the frame and/or pulleys connected to the carriage. The diamond-impregnated wire loop may be connected to the pulleys.

Offshore platforms have a base structure formed by pipelines. If the offshore platforms are decommissioned and/or dismantled, the pipelines must be removed. The pipelines may extend into the sea floor. Therefore, pipelines are typically removed from the sea floor by cutting the pipelines at a location on the pipeline adjacent to the sea floor. Known systems exist for cutting the pipelines. For example, known systems for cutting the pipelines may use diamond-impregnated beads affixed to a continuous strand of rubber-encapsulated steel wire that is looped onto a drive pulley and driven at a high speed.

The known systems require clearance on multiple sides of the pipeline. The clearance required by the known systems may hinder the systems from cutting the pipeline. For example, the clearance required by the known systems may increase a distance between the cut and the sea floor. Thus, after cutting by the known systems, a portion of the pipeline may continue to extend from the sea floor. Moreover, the clearance required by the known systems may prevent the systems from cutting the pipeline if the pipeline is adjacent to obstructions. Thus, known systems may not cut the pipeline if the pipeline is adjacent to obstructions.

SUMMARY OF THE INVENTION

The present invention generally relates to an apparatus, a system and a method for using a diamond impregnated wire to cut an object. More specifically, the present invention relates to an apparatus that may use a diamond impregnated wire loop to cut an underwater pipeline. The apparatus may have a frame, a carriage attached to the frame and/or pulleys connected to the carriage. The diamond impregnated wire may be connected to the pulleys. The carriage may move relative to the frame to direct the diamond impregnated wire loop in a forward direction relative to the frame and/or through the pipeline.

To this end, in an embodiment of the present invention, an apparatus for cutting an object is provided. The apparatus has a carriage having a first end and a second end wherein the second end is located in a position opposite to the first end; a first pulley connected to the carriage wherein the first pulley is adjacent to the second end of the carriage; a second pulley connected to the carriage wherein the second pulley is adjacent to the second end of the carriage; a diamond-impregnated wire attached to the first pulley and the second pulley wherein the diamond-impregnated wire travels through the first pulley and the second pulley; and a frame having a first end and a second end located in a position opposite to the first end wherein the carriage is connected to the frame and further wherein the second end of the frame is located at a distance from the second end of the carriage wherein the carriage moves from a first position relative to the frame to a second position relative to the frame and further wherein the carriage subsequently moves from the second position to the first position wherein the distance from the second end of the frame to the second end of the carriage in the first position is less than the distance from the second end of the frame to the second end of the carriage in the second position.

In an embodiment, the apparatus has an actuator connected to the frame wherein the actuator has a tube and a cylinder which extends from the tube and further wherein movement of the cylinder in a first direction relative to the tube moves the carriage from the first position to the second position wherein movement of the cylinder in a second direction relative to the tube which is opposite to the first direction moves the carriage from the second position to the first position.

In an embodiment, the apparatus has a shaft connected to the second end of the frame wherein an arm which is substantially perpendicular to the shaft connects the shaft to the carriage and further wherein rotation of the shaft in a first direction uses the arm to move the carriage from the first position to the second position wherein rotation of the shaft in a second direction which is opposite to the first direction uses the arm to move the carriage from the second position to the first position.

In an embodiment, the apparatus has a third pulley connected to the carriage wherein the third pulley is adjacent to the first end of the carriage and further wherein the wire travels through the first pulley, the second pulley and the third pulley.

In an embodiment, the apparatus has a connector that connects the first end of the carriage to the frame wherein the first end of the carriage is pivotally connected to the connector such that an angle between the frame and the carriage in the second position is greater than the angle between the frame and the carriage in the first position.

In an embodiment, the diamond-impregnated wire is electroplated with a single layer of diamond beads.

In an embodiment, the apparatus has a first rail, a second rail and a bar of the frame wherein the bar connects the first rail to the second rail and further wherein the bar is substantially perpendicular to the first rail and the second rail wherein the first rail and the second rail are substantially parallel to each other.

In an embodiment, the apparatus has a column of the carriage which is connected to the first end of the frame wherein the column is located at the first end of the carriage and further wherein rotation of the column in a first direction moves the carriage from the first position to the second position wherein rotation of the column in a second direction which is opposite to the first direction moves the carriage from the second position to the first position.

In an embodiment, the apparatus has a first column and a second column of the carriage wherein the first column and the second column are substantially parallel to each other and further wherein the first column and the second column extend from the first end of the carriage to the second end of the carriage wherein the first pulley is connected to the first column and the second pulley is connected to the second column.

In an embodiment, the distance from the first end of the frame to the first end of the carriage in the first position is less than the distance from the first end of the frame to the first end of the carriage in the second position.

In another embodiment of the present invention, a method for cutting an object using a carriage connected to a frame is provided. Pulleys are connected to the carriage, and a diamond-impregnated wire is connected to the pulleys. The carriage has a first end and a second end located in a position opposite to the first end, and the frame has a first end and a second end located in a position opposite to the first end. The method has the steps of moving the carriage from a first position relative to the frame to a second position relative to the frame wherein the first end of the carriage is adjacent to the first end of the frame if the carriage is located in the first position and further wherein moving the carriage from the first position to the second position moves the first end of the carriage in a first direction wherein the second end of the carriage is adjacent to the second end of the frame if the carriage is located in the first position and further wherein moving the carriage from the first position to the second position moves the second end of the carriage in a second direction; cutting the object wherein the object is cut by the diamond-impregnated wire as the carriage moves from the first position relative to the frame to the second position relative to the frame; and moving the carriage from the second position to the first position.

In an embodiment, the method has the step of pivoting a first clamp and a second clamp inward toward each other before moving the carriage relative to the frame wherein the first clamp and the second clamp are attached to the frame and further wherein the first clamp and the second clamp are pivoted outward relative to each other after cutting the object.

In an embodiment, the method has the step of moving a cylinder connected to a tube from a first position relative to the tube to a second position relative to the tube wherein moving the cylinder from the first position relative to the tube to the second position relative to the tube moves the carriage from the first position relative to the frame to the second position relative to the frame and further wherein moving the cylinder from the second position relative to the tube to the first position relative to the tube moves the carriage from the second position relative to the frame to the first position relative to the frame.

In an embodiment, the method has the step of rotating a shaft connected to the frame wherein rotating the shaft in a first direction moves the carriage from the first position to the second position and further wherein rotating the shaft in a second direction opposite to the first direction moves the carriage from the second position to the first position relative.

In an embodiment, the second direction is substantially perpendicular to the first direction.

In another embodiment of the present invention, a system for cutting an object is provided. The system has a frame; a carriage connected to the frame wherein the carriage moves from a first position relative to the frame to a second position relative to the frame and further wherein the carriage is substantially parallel to the frame if the carriage is in the first position wherein the frame is angled relative to the frame if the carriage is in the second position; pulleys connected to the carriage; a wire attached to the pulleys wherein the wire travels through the pulleys; diamond beads attached to the wire; a first clamp having a first end and a second end located in a position opposite to the first end wherein the first end of the first clamp is connected to the frame; a second clamp connected to the frame having a first end and a second end located in a position opposite to the first end wherein the first end of the second clamp is connected to the frame; and a rod connected to the first clamp and the second clamp wherein the rod rotates in a first direction to pivot the second end of the first clamp and the second end of the second clamp toward each other and further wherein the rod rotates in a second direction opposite to the first direction to pivot the second end of the first clamp and the second end of the second clamp away from each other.

In an embodiment, the system has a first arm and a second arm connected to the rod wherein the first arm and the second arm are substantially perpendicular to the rod and wherein the first clamp is connected to the rod by the first arm and the second clamp is connected to the rod by the second arm.

In an embodiment, the system has an actuator having a cylinder connected to the rod wherein moving the cylinder rotates the rod.

In an embodiment, the system has a first bar and a second bar of the first clamp which are substantially parallel to each other wherein the first bar and the second bar extend from the first end of the first clamp to the second end of the first clamp.

In an embodiment, the system has a first column and a second column of the carriage and a first rail and a second rail of the frame wherein the first column and the second column are substantially parallel to the first rail and the second rail if the carriage is in the first position wherein the first column and the second column are angled relative to the first rail and the second rail if the carriage is in the second position.

It is, therefore, an advantage of the present invention to provide an apparatus, a system and a method for using a diamond-impregnated wire to cut an object.

Another advantage of the present invention is to provide an apparatus, a system and a method for using a diamond-impregnated wire to cut an object which may use a diamond-impregnated wire to cut an underwater pipeline.

A further advantage of the present invention is to provide an apparatus, a system and a method for using a diamond-impregnated wire to cut an object which may rotate the diamond-impregnated wire relative to the plane of the cut.

Yet another advantage of the present invention is to provide an apparatus, a system and a method for using a diamond-impregnated wire to cut an object which may reduce wear on the diamond-impregnated wire relative to known cutting apparatuses.

Another advantage of the present invention is to provide an apparatus, a system and a method for using a diamond-impregnated wire to cut an object which may reduce time required to cut an object relative to known cutting apparatuses.

A further advantage of the present invention is to provide an apparatus, a system and a method for using a diamond-impregnated wire to cut an object which may reduce space required to install and/or operate the apparatus relative to known cutting apparatuses.

Yet another advantage of the present invention is to provide an apparatus, a system and a method for using a diamond-impregnated wire to cut an object which may reduce space required to transport and/or store the apparatus relative to known cutting apparatuses.

Another advantage of the present invention is to provide an apparatus, a system and a method for using a diamond-impregnated wire to cut an object which may be controlled using a remotely operated vehicle (ROV) interface.

A further advantage of the present invention is to provide an apparatus, a system and a method for using a diamond-impregnated wire to cut an object which may operate using hydraulic power.

Yet another advantage of the present invention is to provide an apparatus, a system and a method for using a diamond-impregnated wire to cut an object which may cut a pipeline having a diameter from twenty four inches to forty inches.

Another advantage of the present invention is to provide an apparatus, a system and a method for using a diamond-impregnated wire to cut an object which may enable replacement of the diamond-impregnated wire without removing the apparatus from a pipeline.

A further advantage of the present invention is to provide an apparatus, a system and a method for using a diamond-impregnated wire to cut an object which may cut adjacent to a seabed without excavation of the seabed.

Yet another advantage of the present invention is to provide an apparatus, a system and a method for using a diamond-impregnated wire to cut an object which may reduce a volume of excavation for sub-seabed cuts relative to known cutting apparatuses.

Another advantage of the present invention is to provide an apparatus, a system and a method for using a diamond-impregnated wire to cut an object which may have a self-compensating feed circuit which may automatically adjust the feed rate to an efficient cutting speed.

A further advantage of the present invention is to provide an apparatus, a system and a method for using a diamond-impregnated wire to cut an object which may increase the cutting horsepower of the diamond impregnated wire relative to known cutting apparatuses.

Yet another advantage of the present invention is to provide an apparatus, a system and a method for using a diamond-impregnated wire to cut an object which may be installed in any orientation.

Another advantage of the present invention is to provide an apparatus, a system and a method for using a diamond-impregnated wire to cut an object which may use an electroplated wire.

A further advantage of the present invention is to provide an apparatus, a system and a method for using a diamond-impregnated wire to cut an object which may reduce labor and time required to install and/or remove the apparatus relative to known cutting apparatuses.

Yet another advantage of the present invention is to provide an apparatus, a system and a method for using a diamond-impregnated wire to cut an object which may cut multiple-string underwater pipelines which may contain aggregate fill material.

Another advantage of the present invention is to provide an apparatus, a system and a method for using a diamond-impregnated wire to cut an object which may achieve linear wire travel.

A further advantage of the present invention is to provide an apparatus, a system and a method for using a diamond-impregnated wire to cut an object which may have a pressure compensation valve.

Moreover, an advantage of the present invention is to provide an apparatus, a system and a method for using a diamond-impregnated wire to cut an object which may reduce the weight of the apparatus relative to known cutting apparatuses.

Additional features and advantages of the present invention are described in, and will be apparent from, the detailed description of the presently preferred embodiments and from the drawings.

BRIEF DESCRIPTION OF THE DRAWINGS

FIG. 1 illustrates a perspective front view of a cutting apparatus in a retracted position in an embodiment of the present invention.

FIG. 2 illustrates a perspective rear view of a cutting apparatus in a retracted position in an embodiment of the present invention.

FIG. 4 illustrates a perspective rear view of a cutting apparatus in an extended position in an embodiment of the present invention.

FIG. 5 illustrates a side view of a cutting apparatus in a retracted position in an embodiment of the present invention.

FIG. 6 illustrates a side view of a cutting apparatus in an extended position in an embodiment of the present invention.

FIG. 11 illustrates a side view of a cutting apparatus in a retracted position with a pipeline in an embodiment of the present invention.

FIG. 12 illustrates a side view of a cutting apparatus in an extended position with a pipeline in an embodiment of the present invention.

FIG. 13 illustrates a perspective front view of a cutting apparatus in a retracted position with a pipeline in an embodiment of the present invention.

FIG. 14 illustrates a perspective front view of a cutting apparatus in an extended position with a pipeline in an embodiment of the present invention.

FIG. 15 illustrates a perspective rear view of a cutting apparatus in a retracted position with a pipeline in an embodiment of the present invention.

FIG. 16 illustrates a perspective rear view of a cutting apparatus in an extended position with a pipeline in an embodiment of the present invention.

FIG. 17 illustrates a side view of a cutting apparatus in a retracted position with a pipeline in an embodiment of the present invention.

FIG. 18 illustrates a side view of a cutting apparatus in an extended position with a pipeline in an embodiment of the present invention.

FIGS. 19A and 19B illustrate a side view of a first actuator of a cutting apparatus in embodiments of the present invention.

FIG. 19C illustrates a perspective view of a first actuator of a cutting apparatus in embodiments of the present invention.

FIGS. 22A and 22B illustrate a perspective rear view of a clamp system for a cutting apparatus in an embodiment of the present invention.

DETAILED DESCRIPTION OF THE PRESENTLY PREFERRED EMBODIMENTS

The present invention generally relates to an apparatus, a system and a method for using a diamond-impregnated wire to cut an object. More specifically, the present invention relates to an apparatus that may use a diamond-impregnated wire loop to cut an underwater pipeline. The apparatus may use the diamond-impregnated wire loop to cut single-string and/or multiple-string underwater pipelines which may contain aggregate fill material. The apparatus may have a frame, a carriage attached to the frame and/or pulleys connected to the carriage. The diamond-impregnated wire loop may be connected to the pulleys. The carriage may move relative to the frame to direct the diamond-impregnated wire loop in a forward direction relative to the frame and/or through the pipeline. Hydraulic power may move the carriage relative to the frame. The frame of the apparatus may be positioned substantially parallel to the longitudinal direction of the pipeline during cutting.

Figure 3:
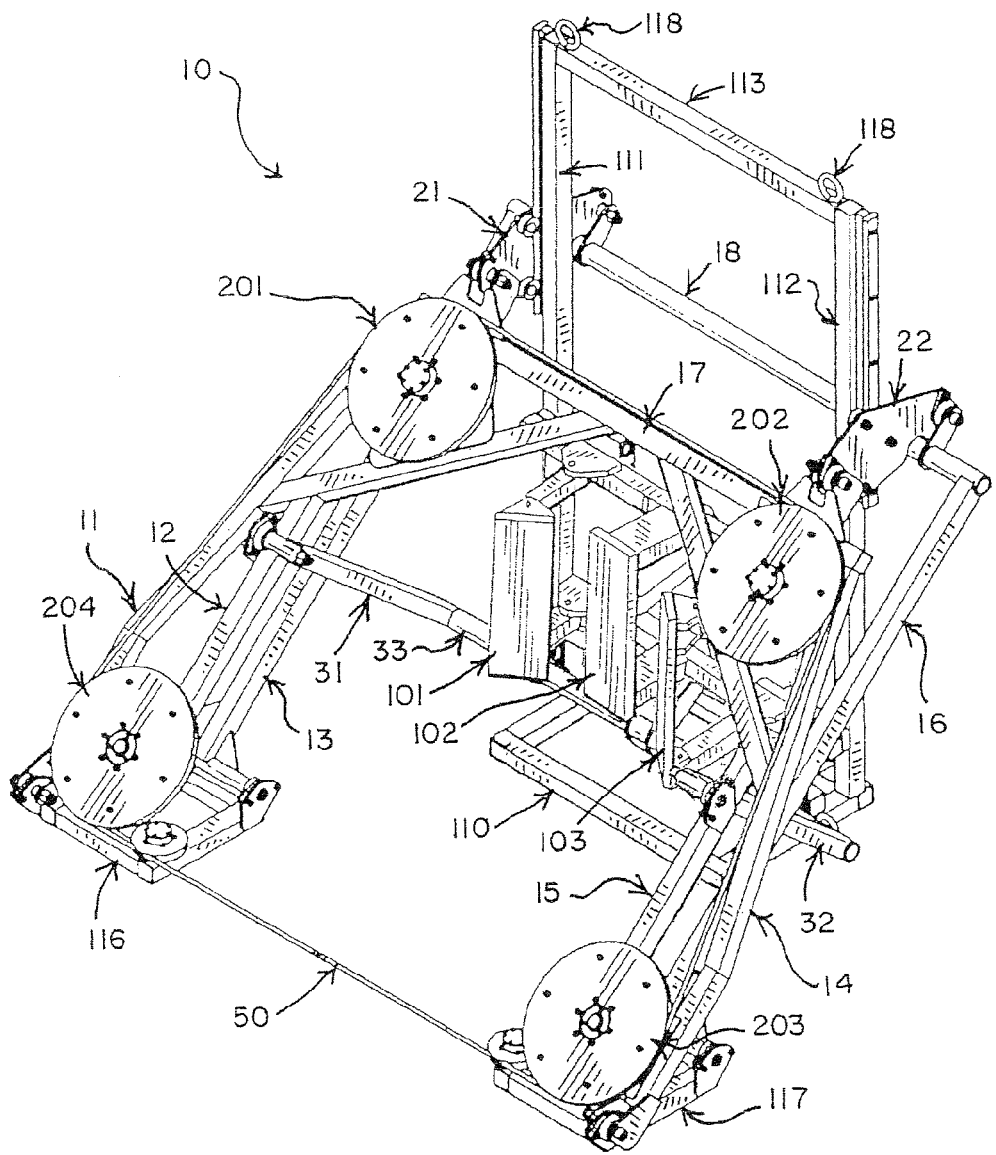
FIG. 3 illustrates a perspective front view of a cutting apparatus in an extended position in an embodiment of the present invention.
Figure 7:
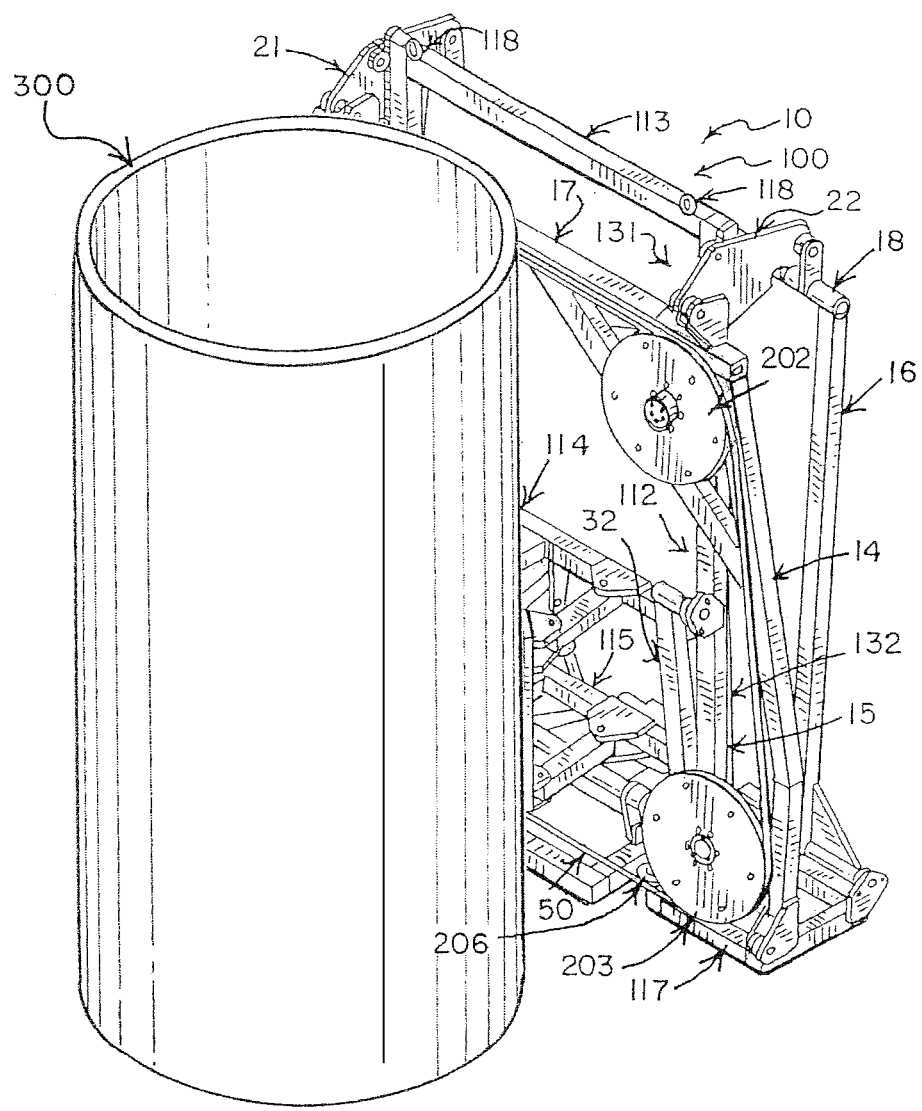
FIG. 7 illustrates a perspective front view of a cutting apparatus in a retracted position with a pipeline in an embodiment of the present invention.
Figure 8:
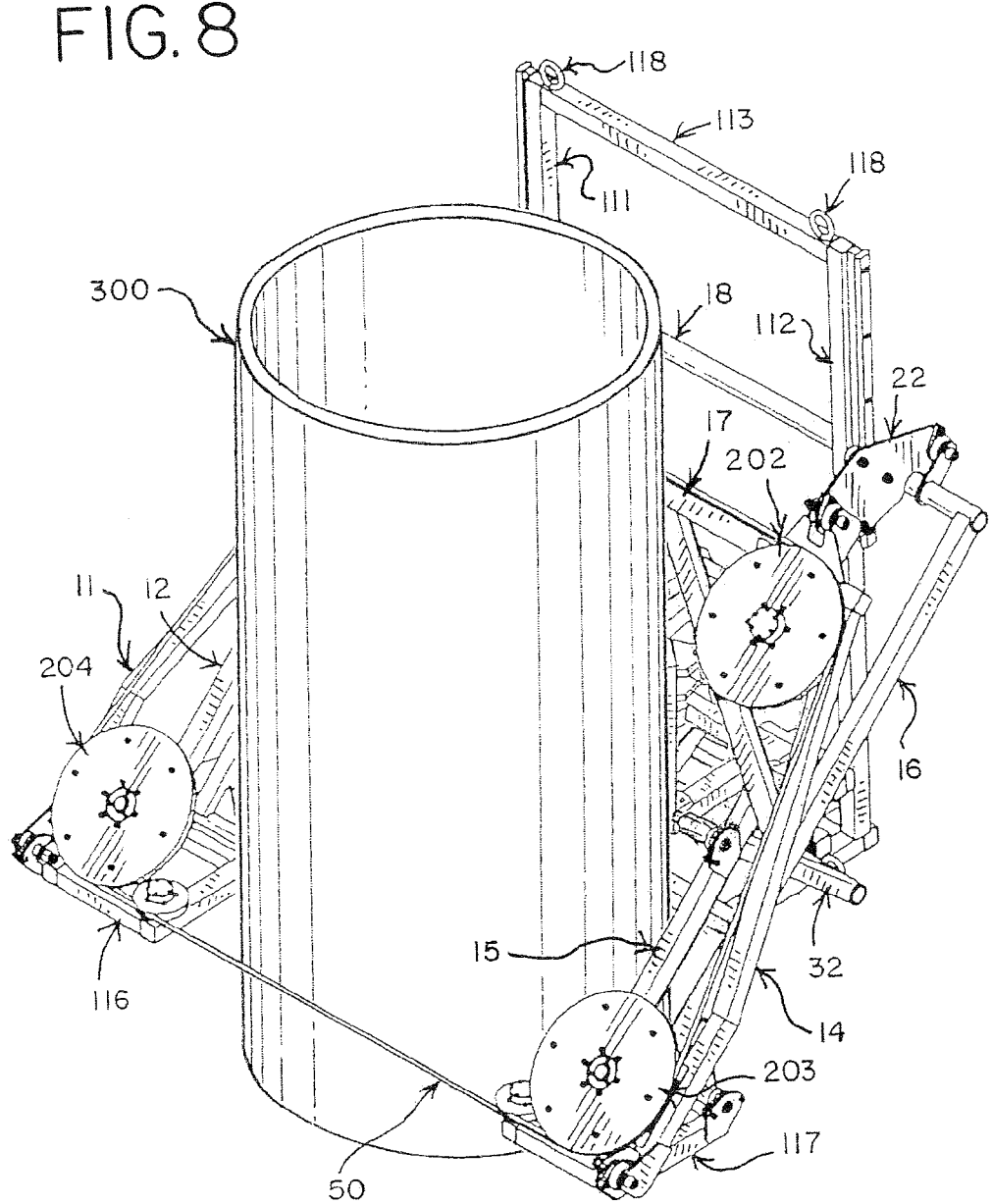
FIG. 8 illustrates a perspective front view of a cutting apparatus in an extended position with a pipeline in an embodiment of the present invention.
Figure 9:
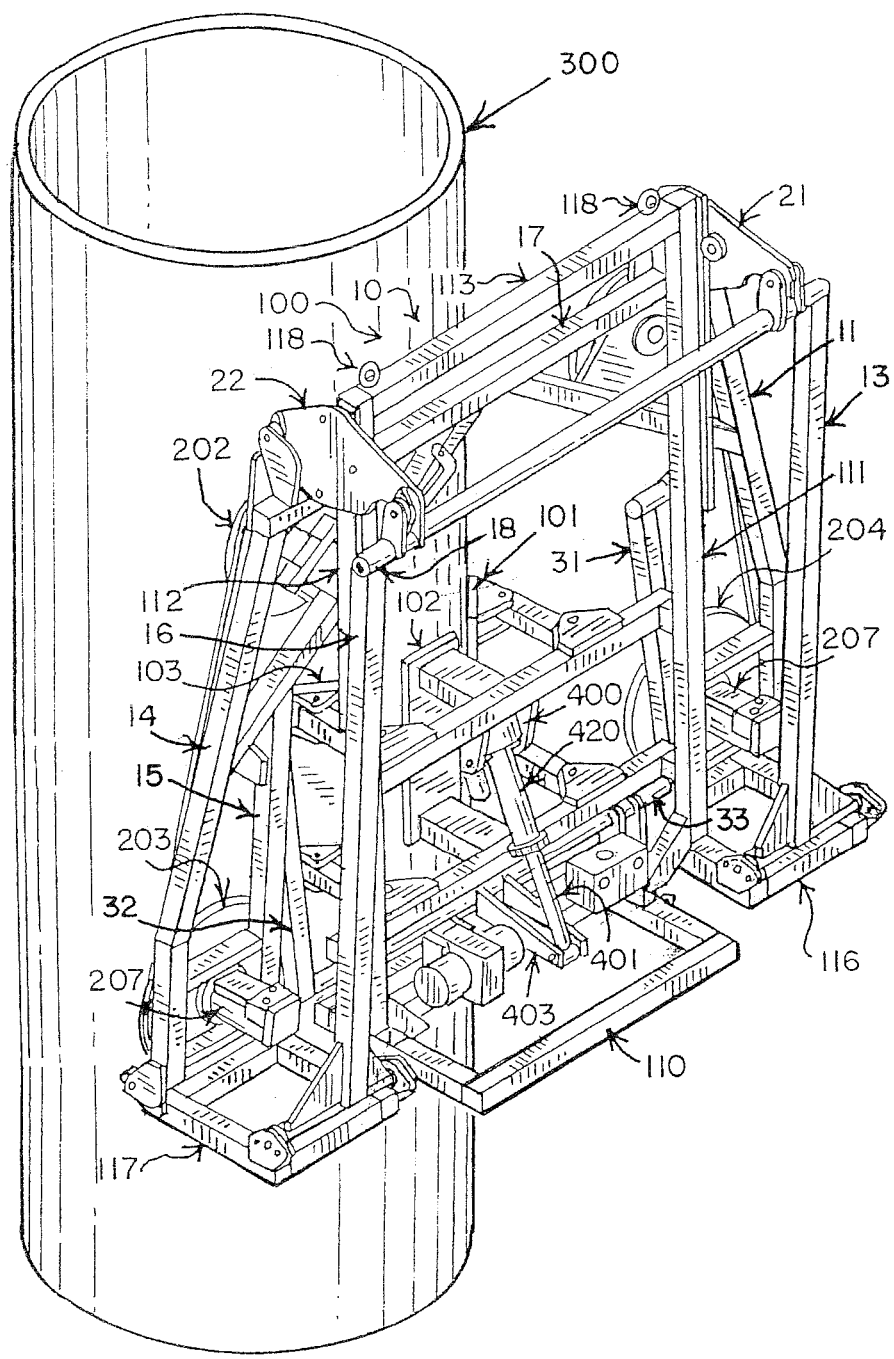
FIG. 9 illustrates a perspective rear view of a cutting apparatus in a retracted position with a pipeline in an embodiment of the present invention.
Figure 10:
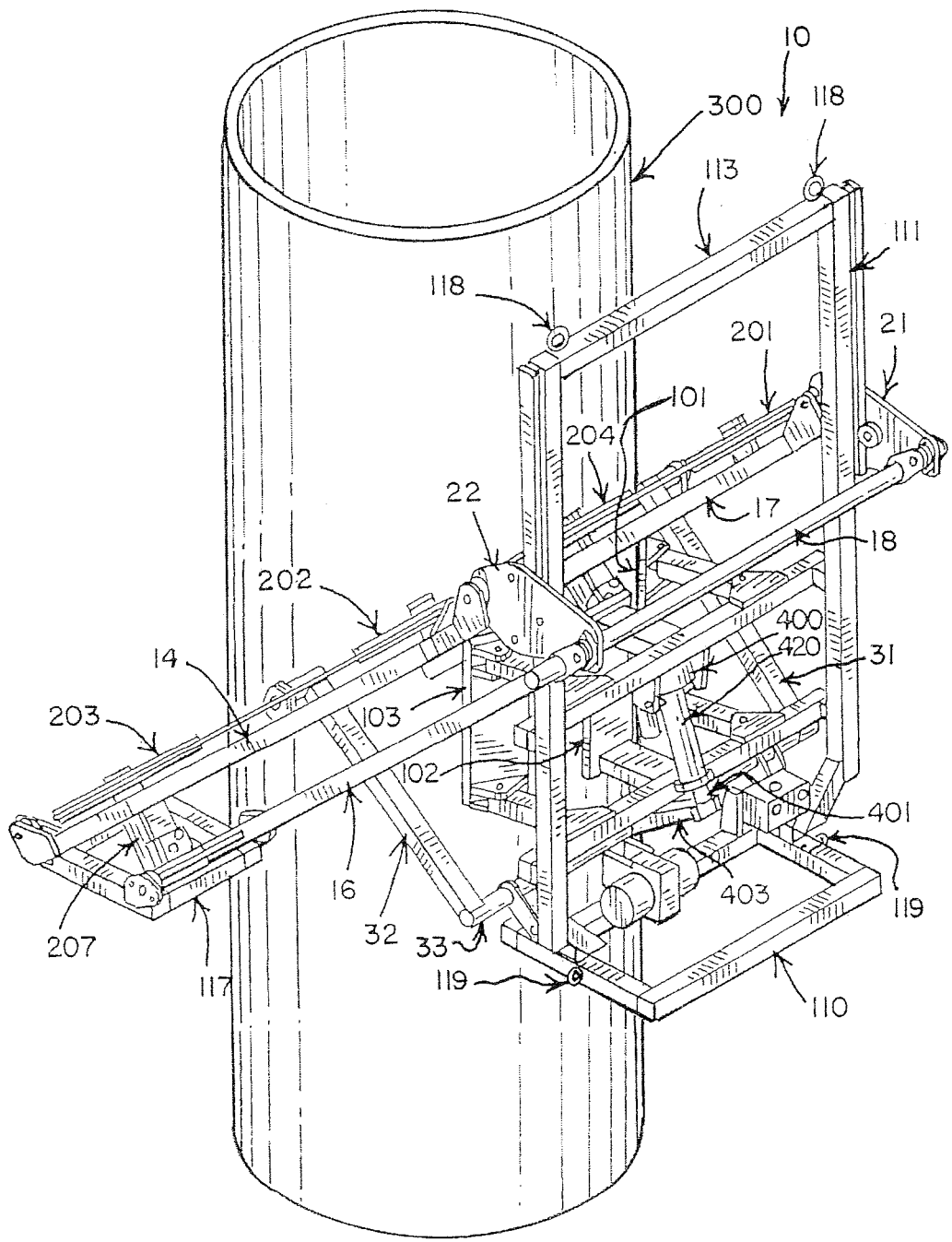
FIG. 10 illustrates a perspective rear view of a cutting apparatus in an extended position with a pipeline in an embodiment of the present invention.

Referring now to the drawings wherein like numerals refer to like parts, FIGS. 1-18 generally illustrate a cutting apparatus 10 in embodiments of the present invention. The cutting apparatus 10 may have a frame 100 and/or a carriage 200 which may be connected to the frame 100. The carriage 200 may move relative to the frame 100 as described in more detail hereafter. The carriage 200 may have at least two pulleys. For example, the carriage 200 may have a first pulley 201, a second pulley 202, a third pulley 203 and/or a fourth pulley 204. The carriage 200 may have a first end 210 and a second end 220 located in a position opposite to the first end 210. The first pulley 201 and/or the second pulley 202 may be located adjacent to the first end 210 of the carriage 200, and/or the third pulley 203 and/or the fourth pulley 204 may be located adjacent to the second end 220 of the carriage 200.

A wire 50 may be connected to the carriage 200. For example, the wire 50 may be connected to the first pulley 201, the second pulley 202, the third pulley 203 and/or the fourth pulley 204. For example, in an embodiment, the wire 50 may be a loop that travels through the first pulley 201, the second pulley 202, the third pulley 203 and/or the fourth pulley 204. In an embodiment, the wire 50 may be a loop formed by a wire having a length of twenty feet. Diamond beads may be adhered to, impregnated into and/or affixed on the wire 50. The wire may have a surface area, and the diamond beads may be distributed substantially continuously and/or evenly over the surface area of the wire 50. In an embodiment, the diamond beads may be sintered to the wire 50. In another embodiment, the diamond beads may be electroplated on the wire 50 by using electric current to coat the wire 50 with a single layer of the diamond beads. In an embodiment, the wire 50 may be a steel wire. The present invention is not limited to a specific embodiment of the wire 50.

One or more of the first pulley 201, the second pulley 202, the third pulley 203 and/or the fourth pulley 204 may be a motorized pulley. The motorized pulley may be connected to a pulley motor 207 which may provide power to the motorized pulley. In an embodiment, the pulley motor 207 may be a hydraulic motor. The pulley motor 207 may be any motor known to one having ordinary skill in the art. The motorized pulley may rotate to direct the wire 50 through the first pulley 201, the second pulley 202, the third pulley 203 and/or the fourth pulley 204. The pulley motor 207 may control a rotation rate of the motorized pulley. The pulley motor 207 may control a wire speed at which the wire 50 travels through the first pulley 201, the second pulley 202, the third pulley 203 and/or the fourth pulley 204 by adjusting the rotation rate of the motorized pulley. The present invention is not limited to a specific embodiment of the motorized pulley or the number of pulleys which are motorized pulleys, and the motorized pulley may be any pulley which directs the wire 50 through the first pulley 201, the second pulley 202, the third pulley 203 and/or the fourth pulley 204.

The frame 100 may have a base 110. The frame 100 may have a first rail 111 and/or a second rail 112 which may be substantially parallel to each other and/or which may extend from the base 110. The first rail 111 may have a first end 121 and a second end 122 located in a position opposite to the first end 121. The second rail 112 may have a first end 131 and a second end 132 located in a position opposite to the first end 131. A distance from the first end 121 of the first rail 111 to the second end 122 of the first rail 111 may be approximately equal to a distance from the first end 131 of the second rail 112 to the second end 132 of the second rail 112. The base 110 may be connected to the second end 122 of the first rail 111 and/or the second end 132 of the second rail 112.

The frame 100 may have a first bar 113, a second bar 114 and/or a third bar 115 which may connect the first rail 111 to the second rail 112. The first bar 113 may be connected to the first end 121 of the first rail 111 and/or the first end 131 of the second rail 112. The first bar 113, the second bar 114 and/or the third bar 115 may be substantially perpendicular to the first rail 111 and/or the second rail 112. The first bar 113, the second bar 114 and/or the third bar 115 may be substantially parallel to each other.

The frame 100 may have first rings 118 and/or second rings 119 which may be located in a position opposite to the first rings 118. For example, the first rings 118 may be connected to the first bar 113, and/or the second rings 119 may be connected to the base 110. The first rings 118 and/or the second rings 119 may enable transportation of the cutting apparatus 10. For example, a transporting vehicle (not shown) may have hooks which may insert into the first rings 118 and/or the second rings 119 to transport the cutting apparatus 10.

The frame 100 may be connected to one or more plates. For example, as shown in FIGS. 1-18, a first side plate 101, a central plate 102 and/or a second side plate 103 may be connected to the frame 100. The first side plate 101, the central plate 102 and/or the second side plate 103 may be attached to the second bar 114 and/or the third bar 115. The first side plate 101, the central plate 102 and/or the second side plate 103 may contact a pipeline 300 to align the pipeline 300 with the cutting apparatus 10 for cutting the pipeline 300 with the wire 50. The present invention is not limited to cutting a pipeline, and any object may be cut using the cutting apparatus 10.

In an embodiment, one or more of the first side plate 101, the central plate 102 and/or the second side plate 103 may provide a substantially flat surface which may face away from the frame 100. The first side plate 101, the central plate 102 and/or the second side plate 103 may be any shape. In an embodiment, the first side plate 101, the central plate 102 and/or the second side plate 103 may be substantially rectangular. The first side plate 101 and/or the second side plate 103 may be angled relative to the central plate 102 to align the pipeline 300 with the cutting apparatus 10.

The carriage 200 may have a first column 11, a second column 12, a third column 13, a fourth column 14, a fifth column 15 and/or a sixth column 16. The first column 11, the third column 13, the fourth column 14 and/or the sixth column 16 may extend from the first end 210 of the carriage 200 to the second end 220 of the carriage 200. The second column 12, the third column 13, the fifth column 15 and/or the sixth column 16 may be substantially parallel to each other. The first column 11, the second column 12 and/or the third column 13 may be adjacent to each other. In an embodiment, the first pulley 201 and/or the fourth pulley 204 may be connected to and/or may be adjacent to the first column 11. The fourth column 14, the fifth column 15 and/or the sixth column 16 may be adjacent to each other. In an embodiment, the second pulley 202 and/or the third pulley 203 may be connected to and/or may be adjacent to the fourth column 14.

The carriage 200 may have a first foot 116 and/or a second foot 117 which may be located at the second end 220 of the carriage 200. The first foot 116 and/or a second foot 117 may be any shape. In an embodiment, the first foot 116 and/or the second foot 117 may be rectangular. The first foot 116 may be adjacent to the fourth pulley 204, and/or the second foot 117 may be adjacent to the third pulley 203. The first column 11, the second column 12 and/or the third column 13 may connect to the first foot 116. The fourth column 14, the fifth column 15 and/or the sixth column 16 may connect to the second foot 117. A first guide pulley 205 may be connected to the first foot 116, and/or a second guide pulley 206 may be connected to the second foot 117. The wire 50 may travel through the first guide pulley 205 and/or the second guide pulley 206 as the wire 50 travels between the third pulley 203 and the fourth pulley 204.

The carriage 200 may have a seventh column 17 which may connect the first column 11 to the fourth column 14. The seventh column 17 may be located at the first end 210 of the carriage 200. The seventh column 17 may be substantially parallel to the first bar 113. The seventh column 17 may be connected to the frame 100. For example, the seventh column 17 may be connected to the first rail 111 of the frame 100 by a first connector 21, and/or the seventh column 17 may be connected to the second rail 112 of the frame 100 by a second connector 22. The seventh column 17 may be pivotally connected to the first connector 21 and/or the second connector 22. Pivoting the seventh column 17 relative to the first connector 21 and/or the second connector 22 may rotate the seventh column 17 relative to the frame 100, the first connector 21 and/or the second connector 22. Rotation of the seventh column 17 relative to the frame 100, the first connector 21 and/or the second connector 22 may pivot the first column 11 and/or the fourth column 14 relative to the frame 100.

The carriage 200 may have an eighth column 18 which may connect the third column 13 to the sixth column 16. The eighth column 18 may be located at the first end 210 of the carriage 200. The eighth column 18 may be substantially parallel to the first bar 113 and/or the seventh column 17. The eighth column 18 may be connected to the frame 100. For example, the eighth column 18 may be connected to the first rail 111 of the frame 100 by the first connector 21, and/or the eighth column 18 may be connected to the second rail 112 of the frame 100 by the second connector 22. The eighth column 18 may be pivotally connected to the first connector 21 and/or the second connector 22. Pivoting the eighth column 18 relative to the first connector 21 and/or the second connector 22 may rotate the eighth column 18 relative to the frame 100, the first connector 21 and/or the second connector 22. Rotation of the eighth column 18 relative to the frame 100, the first connector 21 and/or the second connector 22 may pivot the third column 13 and/or the sixth column 16 relative to the frame 100.

The frame 100 may have a shaft 33. A first arm 31 and/or a second arm 32 may extend from the shaft 33. The first arm and/or the second arm 32 may be rigidly connected to a shaft 33. The first arm 31 may be located in a position opposite to the second arm 32. The shaft 33 may be substantially perpendicular to the first arm 31 and/or the second arm 32. The shaft 33 may be connected to the frame 100. For example, in an embodiment, the shaft 33 may be pivotally connected to the base 110 of the frame 100. The shaft 33 may be connected to the carriage 200. For example, in an embodiment, the shaft 33 may be pivotally connected to the second column 12 and/or the fifth column 15.

The shaft 33 may rotate relative to the frame 100. Because the first arm 31 and/or the second arm 32 may be rigidly connected to the shaft 33, rotation of the shaft 33 relative to the frame 100 may pivot the first arm 31 and/or the second arm 32 relative to the frame 100. Pivoting the first arm 31 relative to the frame 100 may increase a size of an angle between the first arm 31 and the first rail 111. Pivoting the second arm 32 relative to the frame 100 may increase a size of an angle between the second arm 32 and the second rail 112. Therefore, pivoting the first arm 31 and/or the second arm 32 relative to the frame 100 may move the carriage 200 from a retracted position to an extended position relative to the frame 100 as discussed in more detail hereafter.

A first actuator 400 may rotate the shaft 33 to pivot the first arm 31 and/or the second arm 32 relative to the frame 100. The first actuator 400 may be connected to the shaft 33 and/or the frame 100. In an embodiment, the first actuator 400 may be pivotally connected to the second bar 114. For example, the first actuator 400 may connect to the second bar 114 at a pivot 404 on the first actuator 400. The pivot 404 may enable the first actuator 400 to pivot relative to the frame 100 and/or the second bar 114. The first actuator 400 may have a first cylinder 401 which may extend from the first actuator 400. The first cylinder 401 may be substantially perpendicular to the shaft 33. In an embodiment, an actuator arm 403 may connect the first cylinder 401 to the frame 100. For example, the actuator arm 403 may connect the first cylinder 401 to the shaft 33.

As generally illustrated in FIGS. 19A-C, the first actuator 400 may have a hydraulic drive motor 410, a drive pulley 411 and/or a driven pulley 412. The drive pulley 411 may be connected to the hydraulic drive motor 410, and/or the hydraulic drive motor 410 may rotate the drive pulley 411. A belt 415 may be attached to the drive pulley 411 and/or the driven pulley 412 such that rotation of the drive pulley 411 by the hydraulic drive motor 410 may rotate the driven pulley 412 using the belt 415.

The first actuator 400 may have an actuator tube 420 and/or a second cylinder 402 which may be located in the actuator tube 420. The second cylinder 402 may extend from the driven pulley 412. The second cylinder 402 may be connected to the driven pulley 412 such that rotation of the driven pulley 412 may rotate the second cylinder 402. The first cylinder 401 may have a larger radius than the second cylinder 402 such that the second cylinder 402 may insert into the first cylinder 401. The first cylinder 401 may have a first end 405 which may be located in the actuator tube 420, and/or the second cylinder 402 may insert into the first end 405 of the first cylinder 401. The first end 405 of the first cylinder 401 may be connected to a bushing 430. The first cylinder 401 may have a second end 406 located in a position opposite to the first end 405. The second end 406 of the first cylinder 401 may have a hole 440 which may extend through the second end 406 of the first cylinder 401. The second end 406 of the first cylinder 401 may be connected to a bearing 441 which may be located in the hole 440. The actuator arm 430 may pivotally connect to the second end of the first cylinder 401 using the hole 440 and/or the bearing 441.

The second cylinder 402 may have threads 431. The threads 431 of the second cylinder 402 may connect the second cylinder 402 to the bushing 430 such that rotation of the second cylinder 402 in a first direction may cause the first cylinder 401 to move from an extended position to a retracted position relative to the actuator tube 420. Rotation of the second cylinder 402 in a second direction opposite to the first direction may cause the first cylinder 401 to move from the retracted position to the extended position relative to the actuator tube 420.

Movement of the first cylinder 401 may rotate the shaft 33. For example, the actuator arm 403 may connect the shaft 33 to the second end 406 of the first cylinder 401. Movement of the first cylinder 401 from the extended position to the retracted position relative to the actuator tube 420 may move the actuator arm 403 toward the actuator tube 420 to rotate the shaft 33 in a first direction. Rotation of the shaft 33 in the first direction may cause the first arm 31 and/or the second arm 32 to pivot relative to the frame 100. As previously discussed, the pivoting of the first arm 31 relative to the frame 100 may increase the size of the angle between the first arm 31 and the first rail 111, and/or the pivoting of the second arm 32 relative to the frame 100 may increase the size of the angle between the second arm 32 and the second rail 112. Therefore, the first actuator 400 may rotate the shaft 33 to pivot the first arm 31 and/or the second arm 32 relative to the frame 100. Pivoting the first arm 31 and/or the second arm 32 relative to the frame 100 may move the carriage 200 from the retracted position to the extended position.

As generally illustrated in FIGS. 1, 2, 5, 7, 9, 11, 13, 15 and 17, the carriage 200 may be in the retracted position relative to the frame 100. In the retracted position, the first cylinder 401 may be in the extended position relative to the first actuator 400. In the retracted position, the first end 210 of the carriage 200 may be adjacent to the first end 121 of the first rail 111 of the frame 100 and/or the first end 131 of the second rail 112 of the frame 100. In the retracted position, the second end 220 of the carriage 200 may be adjacent to the second end 122 of the first rail 111 of the frame 100 and/or the second end 132 of the second rail 112 of the frame 100.

As generally illustrated in FIGS. 3, 4, 6, 8, 10, 12, 14, 16 and 18, movement of the first cylinder 401 from the extended position to the retracted position relative to the first actuator 400 may move the carriage 200 from the retracted position to the extended position relative to the frame 100. In the extended position, the first end 210 of the carriage 200 may be located between the first end 121 of the first rail 111 of the frame 100 and the second end 122 of the first rail 111 of the frame 100. In the extended position, the first end 210 of the carriage 200 may be located between the first end 131 of the second rail 112 of the frame 100 and the second end 132 of the second rail 112 of the frame 100. Movement of the carriage 200 from the retracted position to the extended position may move the second end 220 of the carriage 200 away from the second end 122 of the first rail 111 of the frame 100 and/or the second end 132 of the second rail 112 of the frame 100.

Movement of the carriage 200 from the retracted position to the extended position may move the first connector 21 from the first end 121 of the first rail 111 toward the second end 122 of the first rail 111. Movement of the carriage 200 from the retracted position to the extended position may move the second connector 22 from the first end 131 of the second rail 112 toward the second end 132 of the first rail 112. For example, the first rail 111 may have first grooves (not shown), and/or the first connector 21 may be inserted into the first grooves to enable movement of the first connector 21 relative to the first end 121 of the first rail 111. The second rail 112 may have second grooves (not shown), and/or the second connector 22 may be inserted into the second grooves to enable movement of the second connector 22 relative to the first end 131 of the second rail 112. The first connector 21 and the second connector 22 may movably connect to the first rail 111 and/or the second rail 112 using any means known to one having ordinary skill in the art.

Movement of the carriage 200 from the retracted position to the extended position may rotate the seventh column 17 to pivot the first column 11 and/or the third column 13 relative to the first connector 21. Movement of the carriage 200 from the retracted position to the extended position may rotate the eighth column 18 to pivot the fourth column 14 and/or the sixth column 16 relative to the second connector 22.

Movement of the carriage 200 from the retracted position to the extended position may move the wire 50 through the pipeline 300. Movement of the wire 50 through the first pulley 201, the second pulley 202, the third pulley 203 and/or the fourth pulley 204 during movement of the wire 50 through the pipeline 300 may cut the pipeline 300. For example, the first pulley 201, the second pulley 202, the third pulley 203 and/or the fourth pulley 204 may rotate relative to the carriage 200 as the pipeline 300 is cut and/or may transfer torque to the wire 50 as the pipeline 300 is cut.

In an embodiment, the wire 50 may cut the pipeline 300 with a substantially linear cut such that the cut may form one plane. The first pulley 201, the second pulley 202, the third pulley 203 and/or the fourth pulley 203 may rotate the wire 50 relative to the plane of the cut. Rotation of the wire 50 relative to the plane of the cut may increase use of the surface area of the wire 50. Increased use of the surface area of the wire 50 may decrease wear of the wire 50.

The carriage 200 may move from the extended position to the retracted position. For example, the carriage 200 may move from the extended position to the retracted position after cutting the pipeline 300. As a further example, the carriage 200 may move from the extended position to the retracted position to replace the wire 50 without removing the cutting apparatus 10 from the pipeline 300.

Movement of the first cylinder 401 from the retracted position to the extended position relative to the actuator tube 420 may move the carriage 200 from the extended position to the retracted position relative to the frame 100. Movement of the carriage 200 from the extended position to the retracted position relative to the frame 100 may move the second end 220 of the carriage 200 toward the second end 122 of the first rail 111 of the frame 100 and/or the second end 132 of the second rail 112 of the frame 100. Movement of the carriage 200 from the extended position to the retracted position relative to the frame 100 may move the first connector 21 toward the first end 121 of the first rail 111 and/or away from the second end 122 of the first rail 111. Movement of the carriage 200 from the extended position to the retracted position relative to the frame 100 may move the second connector 22 toward the first end 131 of the second rail 112 and/or away from the second end 132 of the first rail 112. Movement of the carriage 200 from the extended position to the retracted position relative to the frame 100 may rotate the seventh column 17 to pivot the first column 11 and/or the third column 13 relative to the first connector 21. Movement of the carriage 200 from the extended position to the retracted position relative to the frame 100 may rotate the eighth column 18 to pivot the fourth column 14 and/or the sixth column 16 relative to the second connector 22.

Movement of the carriage 200 from the extended position to the retracted position relative to the frame 100 may enable the cutting apparatus 10 to be stored and/or to be transported to another location to cut another object. As discussed previously, the movement of the carriage 200 from the extended position to the retracted position relative to the frame 100 may enable replacement of the wire 50 without removing the cutting apparatus 10 from the pipeline 300. For example, the movement of the carriage 200 from the extended position to the retracted position relative to the frame 100 may enable replacement of the wire 50 from a rear of the cutting apparatus 10 such that a position of the pipeline 300 relative to the cutting apparatus 10 may be maintained.

Figure 20:
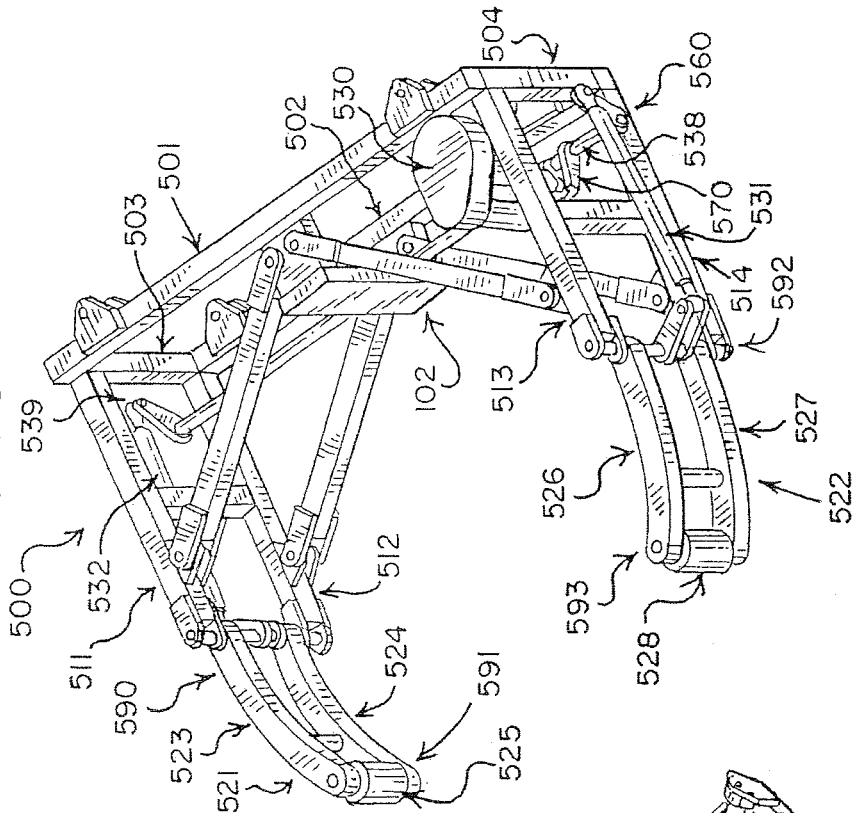
FIG. 20 illustrates a perspective front view of clamp system attached to a cutting apparatus in a retracted position in an embodiment of the present invention.
Figure 21:
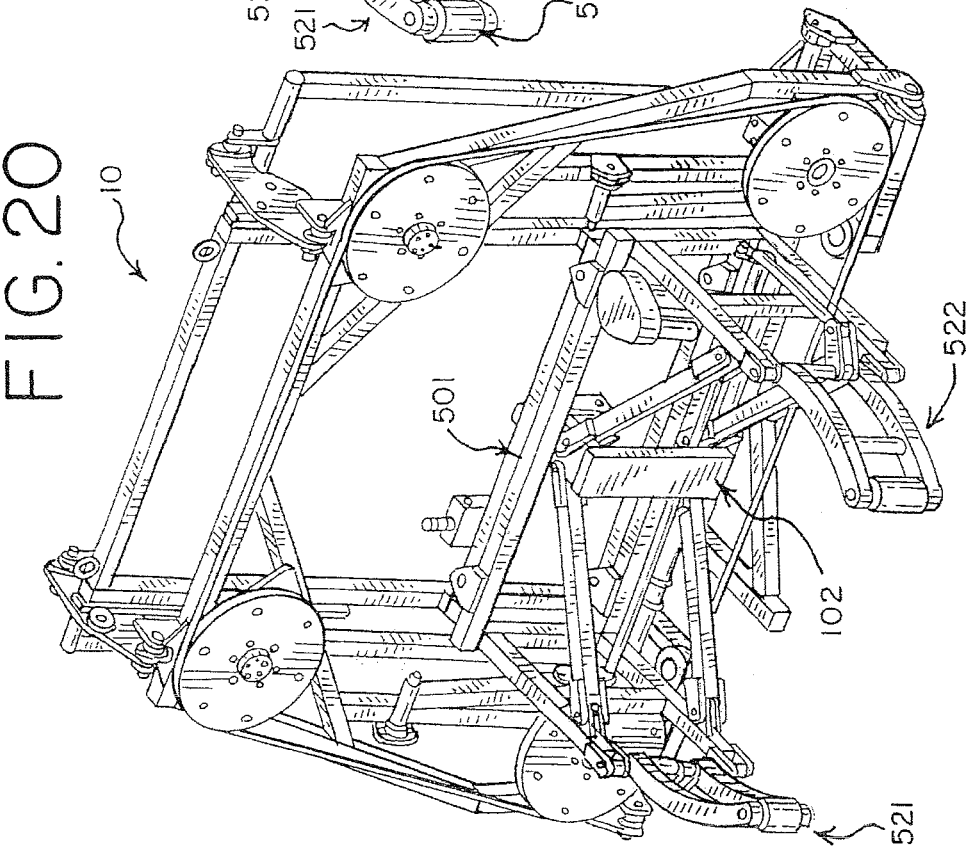
FIG. 21 illustrates a perspective front view of a clamp system for a cutting apparatus in an embodiment of the present invention.

As generally illustrated in FIGS. 20, 21, 22A and 22B, the cutting apparatus 10 may have a clamp system 500 for aligning the pipeline 300 and/or maintaining a position of the pipeline 300 relative to the cutting apparatus 10. The present invention is not limited to a specific means of aligning the pipeline 300 and/or maintaining the position of the pipeline 300 relative to the cutting apparatus 10. For example, the cutting apparatus 10 may use magnets, a tensioned chain, a tensioned cable and/or the like to align the pipeline 300 and/or maintain the position of the pipeline 300 relative to the cutting apparatus 10.

The clamp system 500 may have a first bar 501 and/or a second bar 502. The first bar 501 of the clamp system 500 may be substantially parallel to the second bar 502 of the clamp system 500. The clamp system 500 may have a third bar 503 and/or a fourth bar 504. The third bar 503 of the clamp system 500 may be substantially parallel to the fourth bar 504 of the clamp system 500. The third bar 503 and/or the fourth bar 504 of the clamp system 500 may connect the first bar 501 of the clamp system 500 to the second bar 502 of the clamp system 500. The third bar 503 and/or the fourth bar 504 of the clamp system 500 may be substantially perpendicular to the first bar 501 and/or the second bar 502 of the clamp system 500.

In an embodiment, the central plate 102 may be connected to the clamp system 500. For example, the central plate 102 may be connected to the first bar 501 and/or the second bar 502 of the clamp system 500. Alternatively, the central plate 102 may be connected to the frame 100, and the clamp system 500 may enable the central plate 102 to extend from the frame 100 and/or between the first bar 501 and/or the second bar 502 of the clamp system 500 if the clamp system 500 is attached to the cutting apparatus 10. In an embodiment, the clamp system 500 may be connected to the cutting apparatus 10 by connecting the first bar 501 of the clamp apparatus 500 to the second bar 114 of the cutting apparatus 10 and/or by connecting the second bar 502 of the clamp system 500 to the third bar 115 of the cutting apparatus 10.

The clamp system 500 may have a first rail 511, a second rail 512, a third rail 513 and/or a fourth rail 514 which may be substantially parallel to each other. The first rail 511, the second rail 512, the third rail 513 and/or the fourth rail 514 of the clamp system 500 may be connected to and/or may be substantially perpendicular to the first bar 501, the second bar 502, the third bar 503 and/or the fourth bar 504 of the clamp system 500.

The clamp system 500 may have a first clamp 521 and/or a second clamp 522. The first clamp 521 may have a first end 590 and/or a second end 591 which may be located in a position opposite to the first end 590. The second clamp 522 may have a first end 592 and/or a second end 593 which may be located in a position opposite to the first end 592. The first clamp 521 may be connected to the first rail 511 and/or the second rail 512 of the clamp system 500. The second clamp 522 may be connected to the third rail 513 and/or the fourth rail 514 of the clamp system 500. For example, the first end 590 of the first clamp 521 may be pivotally connected to the first rail 511 and/or the second rail 512 of the clamp system 500, and/or the first end 592 of the second clamp 522 may be pivotally connected to the third rail 513 and/or the fourth rail 514 of the clamp system 500.

In an embodiment, the first clamp 521 may have an upper bar 523 and/or a lower bar 524 which may be connected by a first pad 525, and/or the second clamp 522 may have an upper bar 526 and/or a lower bar 527 which may be connected by a second pad 528. The upper bar 523 and/or the lower bar 524 of the first clamp 521 may extend from the first end 590 to the second end 591 of the first clamp 521. The upper bar 526 and/or the lower bar 527 of the second clamp 522 may extend from the first end 592 to the second end 593 of the second clamp 522. The first pad 525 may be located at the second end 591 of the first clamp 521, and/or the second pad 528 may be located at the second end 593 of the second clamp 522. The present invention is not limited to a specific embodiment of the first clamp 521 and/or the second clamp 522.

The clamp system 500 may have a second actuator 530 which may be connected to the first bar 501, the second bar 502, the third bar 503 and/or the fourth bar 504 of the clamp system 500. The second actuator 530 may have a third cylinder 561 which may extend from the second actuator 530 to connect to a rod 538. For example, extensions 570 may be rigidly attached to the rod 538, and/or the third cylinder 561 may be pivotally connected to the extensions 570. The second actuator 530 may move the third cylinder 561 from a retracted position to an extended position relative to the second actuator 530, and/or the second actuator 530 may move the third cylinder 561 from the extended position to the retracted position relative to the second actuator 530.

The rod 538 may be substantially perpendicular to the third cylinder 561. In an embodiment, the rod 538 may extend from the second rail 512 to the fourth rail 514 of the clamp system 500. The rod 538 may be connected to a third arm 531 and/or a fourth arm 532. For example, the rod 538 may have a first end 539 and/or a second end 560 located in a position opposite to the first end 539. The third arm 531 may be pivotally connected to the second end 560 of the rod 538, and/or the fourth arm 532 may be pivotally connected to the first end 539 of the rod 538. The third arm 531 may be connected to the second clamp 522, and/or the fourth arm 532 may be connected to the first clamp 521. For example, the third arm 531 may be pivotally connected to the second clamp 522, and/or the fourth arm 532 may be pivotally connected to the first clamp 521.

Movement of the third cylinder 561 may rotate the rod 538. For example, if the second actuator 530 moves the third cylinder 561 from the retracted position to the extended position relative to the second actuator 530, the third cylinder 561 may rotate the rod 538 in a first direction by moving the extensions 570 connected to the rod 538 in a direction away from the second actuator 530. If the third cylinder 561 moves from the extended position to the retracted position relative to the second actuator 530, the third cylinder 561 may rotate the rod 538 in a second direction opposite to the first direction by moving the extensions 570 connected to the rod 538 in a direction toward the second actuator 530.

Rotation of the rod 538 in the first direction may pivot the second end 591 of the first clamp 521 and/or the second end 593 of the second clamp 522 inward relative to each other. For example, the rotation of the rod in the first direction may push the third arm 531 and/or the fourth arm 532 toward the second clamp 522 and/or the first clamp 521, respectively. Rotation of the rod 538 in the second direction may pivot the second end 591 of the first clamp 521 and/or the second end 593 of the second clamp 522 outward relative to each other. For example, the rotation of the rod 538 in the second direction may pull the third arm 531 and/or the fourth arm 532 away from the second clamp 522 and/or the first clamp 521, respectively. The first clamp 521 and/or the second clamp 522 may align the pipeline 300 with the cutting apparatus 10 and/or may maintain a position of the pipeline 300 relative to the cutting apparatus 10 for cutting the pipeline 300 with the wire 50.

Operation of the cutting apparatus 10 and/or the clamp system 500 may be controlled remotely, such as, for example, by a remotely operated vehicle interface as known to one having ordinary skill in the art. For example, the cutting apparatus 10 may be located underwater to cut a pipeline 300 located underwater, and the cutting apparatus 10 may be controlled from a vessel located at the water surface.

The first actuator 400 and/or the second actuator 530 may be controlled by instructions from a remote location relative to the cutting apparatus 10 using the remotely operated vehicle interface. For example, a terminal (not shown) may be located remote relative to the cutting apparatus 10, and/or the terminal may provide the remotely operated vehicle interface to a user of the terminal. The terminal may transmit instructions from the user to the cutting apparatus 10. The terminal, may be, for example, a desktop PC, a personal digital assistant (PDA), a mobile telephone, a laptop PC and/or any electronic device which may be capable of receiving and transmitting the instructions to the cutting apparatus 10. The present invention is not limited to a specific embodiment of the terminal or the instructions.

The instructions may direct operation of the first actuator 400 and/or the second actuator 530. The instructions may move the carriage 200 from the extended position to the retracted position relative to the frame 100 and/or may move the carriage 200 from the retracted position to the extended position relative to the frame 100. For example, the instructions may direct the first actuator 400 to move the first cylinder 401 from the extended position to the retracted position relative to the actuator tube 420. Thus, the instructions may move the carriage 200 from the retracted position to the extended position relative to the frame 100. The instructions may direct the first actuator 400 to move the first cylinder 401 from the retracted position to the extended position relative to the actuator tube 420. Thus, the instructions may move the carriage 200 from the extended position to the retracted position relative to the frame 100.

The instructions may control a feed rate. The feed rate may be a speed of movement of the carriage 200 from the extended position to the retracted position relative to the frame 100 and/or from the retracted position to the extended position relative to the frame 100. The feed rate may correspond to a speed which the first actuator 430 moves the first cylinder 401. Thus, the instructions may increase and/or may decrease the feed rate by increasing and/or by decreasing the speed which the first actuator 430 moves the first cylinder 401.

In an embodiment, a circuit (not shown) may automatically control the feed rate. Adjustment of the feed rate may maintain a tension in the wire 50 to be equal to a predetermined tension. For example, as the carriage 200 moves, the tension in the wire 50 may act against a spring which may be attached to a hydraulic control valve. As the wire 50 advances into the pipeline 300, the tension in the wire 50 may increase so that the spring is deflected. As the spring deflects the hydraulic control valve, flow of hydraulic oil to the first actuator 430 may be reduced. Reduced flow of hydraulic oil to the first actuator 430 may decrease the feed rate by decreasing the speed of movement of the first cylinder 401. Therefore, the circuit may direct the first actuator 430 to adjust the speed of movement of the first cylinder 401 to compensate for a size of the pipeline 300, an amount and/or a type of material located in the pipeline 300, and/or other conditions. Accordingly, the feed rate may be maintained at the predetermined feed rate and/or the tension in the wire 50 may stay constant during cutting of the pipeline 300.

As discussed previously, the pulley motor 207 may adjust the speed of the motorized pulley to control the feed rate at which the wire 50 may travel through the first pulley 201, the second pulley 202, the third pulley 203 and/or the fourth pulley 204. The remotely operated vehicle interface may be used by the user and/or the terminal to adjust the speed of the motorized pulley. Adjustment of the speed of the motorized pulley may control the wire speed at which the wire travels through the first pulley 201, the second pulley 202, the third pulley 203 and/or the fourth pulley 204. For example, the instructions transmitted from the terminal to the cutting apparatus 10 may adjust the speed of the motorized pulley.

The instructions transmitted from the terminal may control pivoting inward and/or outward of the second end 591 of the first clamp 521 and/or the second end 593 of the second clamp 522 relative to each other. For example, the instructions may direct the second actuator 530 to move the third cylinder 561 from the retracted position to the extended position relative to the second actuator 530. Movement of the third cylinder 561 from the retracted position to the extended position relative to the second actuator 530 may rotate the rod 538 in a first direction by moving the extensions 570 connected to the rod 538 in a direction away from the second actuator 530. Rotation of the rod 538 in the first direction may pivot the second end 591 of the first clamp 521 and/or the second end 593 of the second clamp 522 inward relative to each other by pushing the first arm 531 and/or the second arm 532 toward the second clamp 522 and/or the first clamp 521, respectively. Pivoting the second end 591 of the first clamp 521 and/or the second end 593 of the second clamp 522 inward relative to each other may align the pipeline 300 with the cutting apparatus 10 and/or may maintain a position of the pipeline 300 relative to the cutting apparatus 10 for cutting the pipeline 300 with the wire 50.

The instructions may direct the second actuator 530 to move the third cylinder 561 from the extended position to the retracted position relative to the second actuator 530. If the third cylinder 561 moves from the extended position to the retracted position relative to the second actuator 530, the third cylinder 561 may rotate the rod 538 in a second direction opposite to the first direction by moving the extensions 570 connected to the rod 538 in a direction toward the second actuator 530. Rotation of the rod 538 in the second direction may pivot the second end 591 of the first clamp 521 and/or the second end 593 of the second clamp 522 outward relative to each other by pulling the first arm 531 and/or the second arm 532 away from the second clamp 522 and/or the first clamp 521, respectively. Pivoting the second end 591 of the first clamp 521 and/or the second end 593 of the second clamp 522 outward relative to each other may release the pipeline 300 after cutting of the pipeline 300 with the wire 50 is completed and/or discontinued.

The cutting apparatus 10 may transmit information to the terminal. For example, tools (not shown) may be attached to the cutting apparatus 10, and/or the tools may obtain the information and/or may transmit the information to the terminal. For example, one or more of the tools may be a video camera that may obtain video data and/or may transmit the video data to the terminal. The terminal may use the remotely operated vehicle interface to display the video data to the user. As a further example, one or more of the tools may be a light to enable the video camera to obtain the video data. As yet another example, one or more of the tools may be a sensor that may obtain a temperature of an environment in which the cutting apparatus 10 is located and/or a pressure of the environment in which the cutting apparatus 10 is located. The sensor may transmit the temperature and/or the pressure to the terminal. The terminal may use the remotely operated vehicle interface to indicate the temperature and/or the pressure to the user. Even further, one or more of the tools may be a positioning tool that may determine a location of the cutting apparatus 10 and/or may transmit the location of the cutting apparatus 10 to the terminal. The terminal may use the remotely operated vehicle interface to indicate the location of the cutting apparatus 10 to the user. The present invention is not limited to a specific embodiment of the information and/or the tools.

It should be understood that various changes and modifications to the presently preferred embodiments described herein will be apparent to those skilled in the art. Such changes and modifications may be made without departing from the spirit and scope of the present invention and without diminishing its attendant advantages.

We claim:

1. A method for cutting an object using a carriage connected to a frame wherein pulleys are connected to the carriage and further wherein a diamond-impregnated wire is connected to the pulleys wherein the carriage has a first end and a second end located in a position opposite to the first end and further wherein the frame has a first end and a second end located in a position opposite to the first end, the method comprising the steps of:

moving the carriage from a first position relative to the frame to a second position relative to the frame wherein the first end of the carriage is adjacent to the first end of the frame if the carriage is located in the first position and further wherein moving the carriage from the first position to the second position moves the first end of the carriage in a first direction wherein the second end of the carriage is adjacent to the second end of the frame if the carriage is located in the first position and further wherein moving the carriage from the first position to the second position moves the second end of the carriage in a second direction that is different than the first direction;

cutting the object wherein the object is cut by the diamond-impregnated wire as the carriage moves from the first position relative to the frame to the second position relative to the frame; and moving the carriage from the second position to the first position.

2. The method of claim 1 further comprising the step of:
pivoting a first clamp and a second clamp inward toward each other before moving the carriage relative to the frame wherein the first clamp and the second clamp are attached to the frame and further wherein the first clamp and the second clamp are pivoted outward relative to each other after cutting the object.

3. The method of claim 1 further comprising the step of:
moving a cylinder connected to a tube from a first position relative to the tube to a second position relative to the tube wherein moving the cylinder from the first position relative to the tube to the second position relative to the tube moves the carriage from the first position relative to the frame to the second position relative to the frame and further wherein moving the cylinder from the second position relative to the tube to the first position relative to the tube moves the carriage from the second position relative to the frame to the first position relative to the frame.

4. The method of claim 1 further comprising the step of:
rotating a shaft connected to the frame wherein rotating the shaft in a first direction moves the carriage from the first position to the second position and further wherein rotating the shaft in a second direction opposite to the first direction moves the carriage from the second position to the first position relative.

5. The method of claim 1 wherein the second direction is substantially perpendicular to the first direction.

* * * * *